US005481918A

United States Patent [19]

Hasegawa et al.

[11] Patent Number: 5,481,918

[45] Date of Patent: Jan. 9, 1996

[54] ACOUSTIC LENS SYSTEM

[75] Inventors: Akira Hasegawa, Mitaka; Masayoshi Omura, Moroyama; Shinichi Imade, Iruma; Eishi Ikuta, Sagamihara, all of Japan

[73] Assignee: Olympus Optical Co., Ltd., Tokyo, Japan

[21] Appl. No.: 258,814

[22] Filed: Jun. 13, 1994

Related U.S. Application Data

[62] Division of Ser. No. 680,235, Apr. 3, 1991, Pat. No. 5,333, 503.

[30] Foreign Application Priority Data

Apr. 3, 1990 [JP] Japan .................................... 2-89319

[51] Int. Cl.[6] .......................... G01N 29/06; G01N 29/24

[52] U.S. Cl. .............................. 73/642; 73/606; 367/150

[58] Field of Search ..................... 73/642, 606; 367/150; 310/335

[56] References Cited

U.S. PATENT DOCUMENTS

| | | | |
|---|---|---|---|
| 3,618,696 | 11/1971 | Hurwitz | 367/150 |
| 3,735,336 | 5/1973 | Long | 367/150 |
| 3,866,711 | 2/1975 | Folds | 367/150 |
| 3,903,909 | 9/1975 | Tannaka | 73/642 |
| 3,958,559 | 5/1976 | Glenn et al. | 73/642 |
| 3,982,223 | 9/1976 | Green | 367/150 |
| 4,001,766 | 1/1977 | Hurwitz | 367/150 |
| 4,183,249 | 1/1980 | Anderson | 73/642 |
| 4,332,018 | 5/1982 | Sternberg et al. | 367/150 |
| 4,409,839 | 10/1983 | Taenzer | 73/642 |
| 4,457,175 | 7/1984 | Ramsey, Jr. et al. | 73/606 |

FOREIGN PATENT DOCUMENTS

| | | |
|---|---|---|
| 51-113601 | 10/1976 | Japan . |
| 55-103600 | 8/1980 | Japan . |

OTHER PUBLICATIONS

W. L. Beaver et al., "Ultrasonic Imaging With An Acoustic Lens", IEEE Transactions on sonics and Ultrasonics, vol. SU-24, No. 4, Jul. 1977, pp. 235-243.

T. Szilard and M. Kidger, "A new ultrasonic lens", Ultrasonics, Nov. 1976 (73/642), pp. 268-272.

*Primary Examiner*—Hezron E. Williams
*Assistant Examiner*—Rose M. Finley
*Attorney, Agent, or Firm*—Cushman, Darby & Cushman

[57] ABSTRACT

An acoustic lens system is constructed so that at least one surface of acoustic lenses constituting the acoustic lens system is an aspherical surface, which has such a shape that curvature moderates progressively in separating from the axis of the acoustic lens system, and an acoustic beam stop is provided therein. As a result, aberrations can be favorably corrected even when the angle of view and the numerical aperture are increased and this brings about the acoustic lens system suitable for an objective lens of an acoustic system for securing an image of an object having a two-dimensional size in particular.

12 Claims, 17 Drawing Sheets

SPHERICAL ABERRATION

ASTIGMATISM

SPHERICAL ABERRATION

ASTIGMATISM

SPHERICAL ABERRATION

ASTIGMATISM

SPHERICAL ABERRATION

ASTIGMATISM

SPHERICAL ABERRATION

ASTIGMATISM

SPHERICAL ABERRATION

ASTIGMATISM

SPHERICAL ABERRATION

ASTIGMATISM

FIG. 28
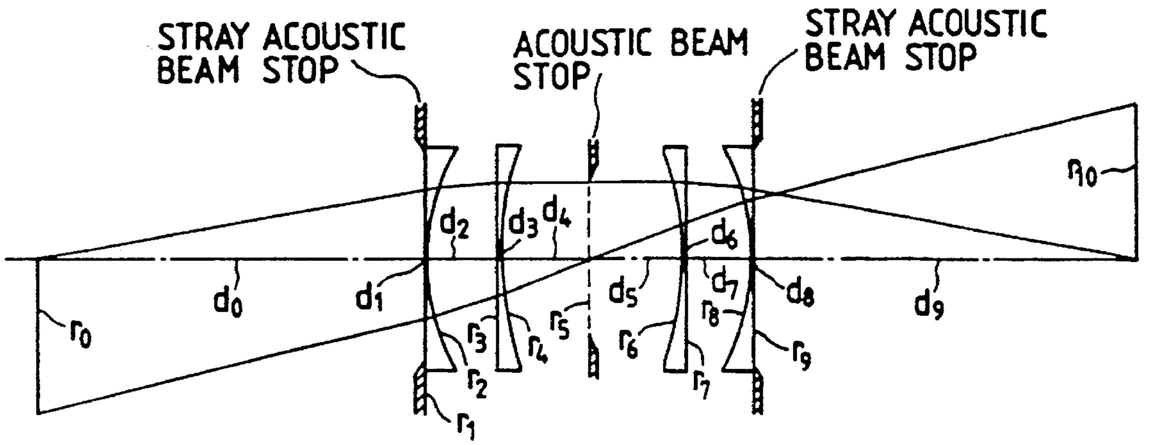
FIG. 29A
SPHERICAL ABERRATION
FIG. 29B
ASTIGMATISM
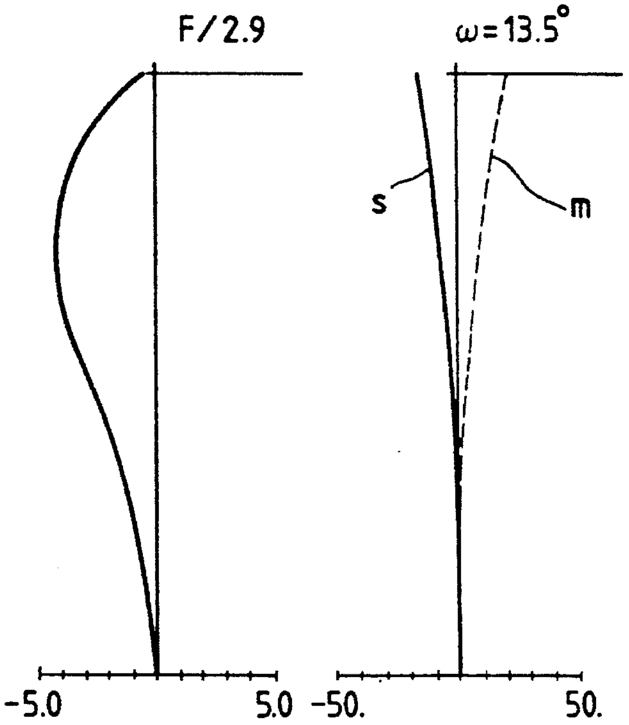

SPHERICAL ABERRATION

ASTIGMATISM

SPHERICAL ABERRATION

ASTIGMATISM

SPHERICAL ABERRATION

ASTIGMATISM

ACOUSTIC LENS SYSTEM

This is a division of application Ser. No. 07/680,235, filed Apr. 3, 1991 now U.S. Pat. No. 5,333,503.

BACKGROUND OF THE INVENTION a) Field of the Invention

This invention relates to an acoustic lens system for forming an image of an object by means of ultrasonic waves and the like.

b) Description of the Prior Art

Recently, apparatus utilizing ultrasonic waves for performing observation, inspection and diagnosis of objects has been developed in relation to various ultrasonographs and ultrasonic microscopes. Each of these apparatuses is adapted to use an acoustic lens and to converge ultrasonic waves generated from a source of sound at a desired position, thereby securing an image of the surface of the object or of the inside thereof in virtue of their echoes from an object. However, most of conventional well-known acoustic lenses, which have no two-dimensional imaging function, need to move a converged point of the ultrasonic waves on the surface of the object for scanning, by moving the object, in order to obtain the image having a certain extended area of the surface of the object, and encounter the problem that the mechanical construction of the device becomes large in scale.

In contrast to this, a system has been devised which is intended to impart the two-dimensional imaging function to the acoustic lens and to bring about the image of the certain extended area without moving the object.

FIG. 1 shows an example of an ultrasonic system of this type. This system is equipped with a transducer 1 comprising a large number of minute ultrasonic elements arrayed in a lattice pattern and an acoustic lens system 2. Each of the ultrasonic elements of the transducer 1 is adapted to be excited by a pulse generator 3 for generation of ultrasonic waves and to receive the ultrasonic waves reflected from the object (the ultrasonic element serves as a transmitter and also as a receiver). The space between the transducer 1 and the object is filled with water or the like.

In the ultrasonic system, one of the ultrasonic elements first produces pulse-like ultrasonic waves, which are converged on the object by the acoustic lens system 2. The ultrasonic waves reflected from the object are converged in the reverse direction on an original ultrasonic element by the acoustic lens system 2 and converted into electrical signals through the ultrasonic element. Then, an adjacent ultrasonic element located in the same line behaves in a like manner. By the repetition of such procedure, after the scanning of one line is completed, the scanning proceeds to the next line. When all the ultrasonic elements finish such behavior, the electrical signals are secured which represent the image of an area on the object corresponding to the size of the ultrasonic transducer 1. The electrical signals are processed by a signal processing circuit 4 to display the object image on a monitor TV 5.

The acoustic lens used in the foregoing system needs to have favorable imaging performance not only at an on-axis position but also at an off-axis position. In the conventional example, however, although the idea that the ultrasonic waves are two-dimensionally imaged is disclosed, a specific structure of the acoustic lens for materializing the idea is not in any sense taught.

SUMMARY OF THE INVENTION

It is, therefore, the object of the present invention to provide an acoustic lens system having favorable imaging performance not only at an on-axis position but also at an off-axis position on the basis of discussion about the properties of the acoustic lens for imaging two-dimensionally the ultrasonic waves or the like.

This object is accomplished, according to the present invention, by the construction that in the acoustic lens system for imaging acoustic waves emanating from the object, at least one of acoustic lenses constituting the acoustic lens system has an aspherical surface.

According to the present invention, the aspherical surface has such a configuration that curvature moderates progressively in separating from the axis of the acoustic lens system and an acoustic beam stop is disposed in the acoustic lens system. Whereby, even when an angle of view and a numerical aperture are increased, various aberrations can be favorably corrected.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 12 and 13A and 13B, 14 and 15A and 15B, 16 and 17A and 17B, 18 and 19A and 19B, 20 and 21A and 21B, 22 and 23A and 23B, 24 and 25A and 25B, 26 and 27A and 27B, 28 and 29A and 29B, 30 and 31A and 31B, 32 and 33A and 33B, and 34 and 35A and 35B are views showing the lens configurations and aberration curves of Embodiments 1 to 12, respectively.

DESCRIPTION OF THE PREFERRED EMBODIMENTS

Prior to the description of the embodiments according to the present invention, referring now to FIGS. 2 to 11, a fundamental consideration of the present invention will be explained.

Figure 1:
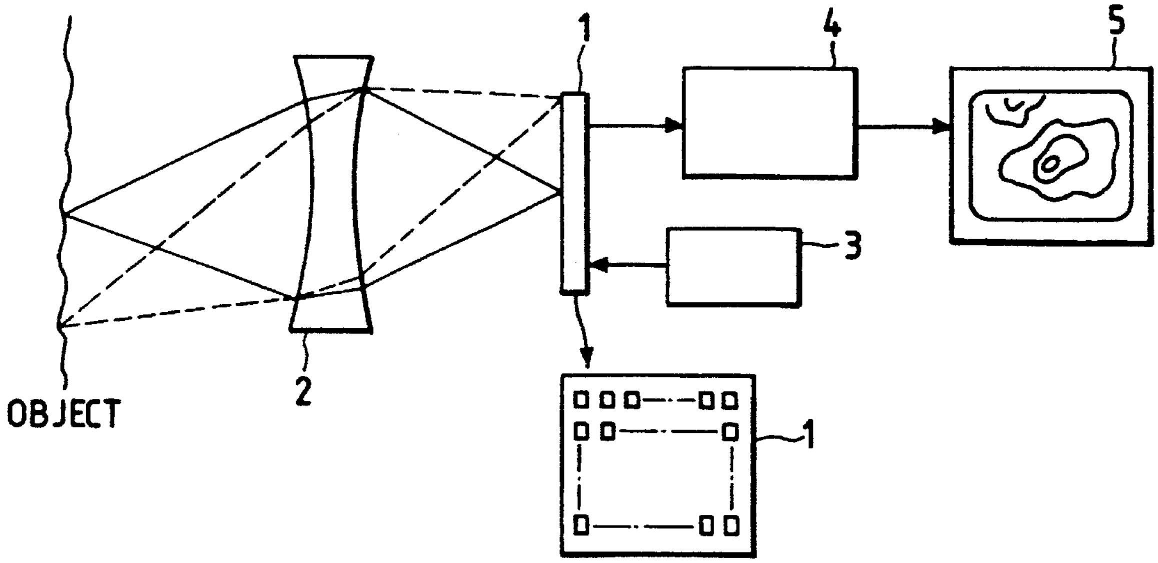
FIG. 1 PRIOR ART
FIG. 1 is a view showing the outline of the arrangement of a conventional ultrasonic apparatus.
Figure 2:
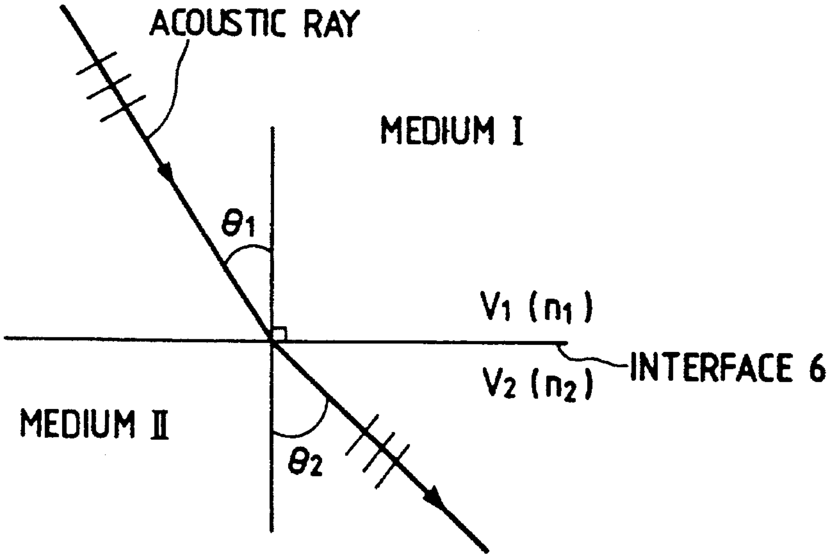
FIG. 2 is a view for explaining the law of refraction of an acoustic wave.

FIG. 2 illustrates the law of refraction relating to acoustic waves. As shown, two different media contact with each other at an interface 6 sandwiched between them and it is assumed that an acoustic wave travels from one medium to the other. As indicated by arrows in the figure, the envelope of the normal of an acoustic wave front is referred to as an acoustic ray. Then, the same law of refraction as for a ray of light in geometrical optics is applied to the acoustic ray. That is, when the velocity of the ultrasonic wave of a certain frequency in a medium I on the incidence side is represented by $v_1$, the velocity of the ultrasonic wave of the same frequency in a medium II on the emergence side by $v_2$, and angles made by the normal to the interface 6 with the acoustic ray on the incidence and emergence sides by $\theta_1$ and $\theta_1$, respectively, the following relationship is established:

$$\sin\theta_1/\sin\theta_2 = v_1/v_2 \qquad (1)$$

In the ultrasonic system, the propagation course of the ultrasonic waves is filled with a liquid, such as water, in order to prevent the attenuation of the ultrasonic waves. Table 1 shows, as a list, the properties of media and water which are likely to be practically usable for the acoustic lens system at present.

TABLE 1

| Medium Item | Water | Polystyrene 550 | TPX004 | TPX002 | Substance of a velocity of sound of 1000 m/s |
|---|---|---|---|---|---|
| Velocity of sound V [m/s] | 1524 | 2276 | 2013 | 1940 | 1000 |
| Refractive index n = Vw/V taking water as a basis | 1 | 0.6696 | 0.7571 | 0.7856 | 1.524 |
| Refractive index n = 3000/V taking medium of velocity of sound of 3000 m/s as a basis | 1.9685 | 1.3181 | 1.4903 | 1.5464 | 3.0 |
| Acoustic impedance [kg/m² · s] | $1.524 \times 10^6$ | $2.39 \times 10^6$ | $1.68 \times 10^6$ | $1.62 \times 10^6$ | |
| Reflectance on interface with water: $r = \frac{Z2 - Z1}{Z2 + Z1}$ | 0 | 0.22 | 0.05 | 0.03 | |

Temperature: 37° C., ultrasonic frequency: 4MHz

Accordingly, if $v_1/v_2$ is regarded as the relative refractive index of both media, the consideration of geometrical optics can be applied to analyze the characteristic of the acoustic lens by using the conception of the acoustic ray.

Figure 3:
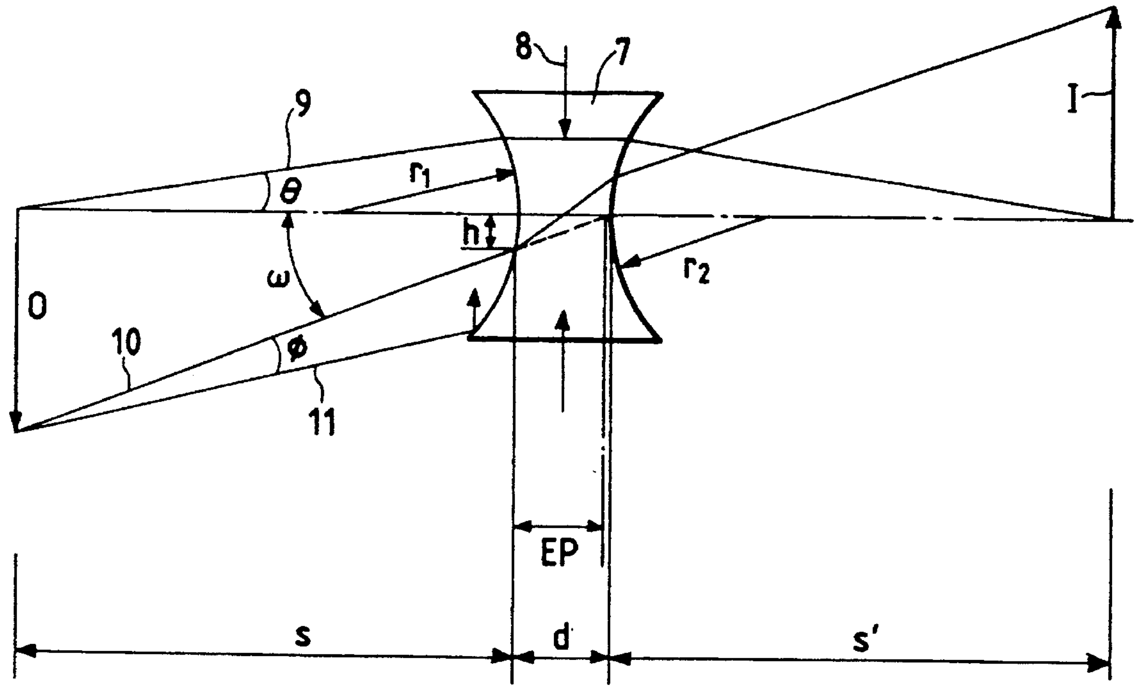
FIGS. 3 to 5 are views showing the states of incidence of acoustic rays on the acoustic lens.

FIG. 3 is a diagram showing the acoustic lens forming the object image with some size (namely, having the angle of view) and the acoustic rays relative to image formation in order to provide reference numerals and symbols employed in the following explanation. In this figure, reference numeral 7 denotes an acoustic lens having a first surface of a radius of curvature $r_1$ and a second surface of a radius of curvature $r_2$, O an object, and I an image of the object O formed by the acoustic lens 7. Reference numeral 8 represents an acoustic beam stop determining the numerical aperture of the acoustic lens. An angle made by an on-axis marginal acoustic ray (namely, an acoustic ray emanating from an on-axis object point to traverse the most outer periphery of the aperture of the acoustic lens) 9 with the axis of the lens is taken as $\theta$, an angle made by an off-axis principal acoustic ray (namely, an acoustic ray emanating from an off-axis object point to pass through the center of the acoustic beam stop) 10 of the maximum image height with the axis, that is, an angle of view, as $\omega$, an angle made by an off-axis marginal acoustic ray (namely, an acoustic ray emanating from the off-axis object point to traverse the most outer periphery of the effective aperture of the acoustic lens) 11 with the off-axis principal acoustic ray 10 as $\phi$, a height of incidence of the off-axis principal acoustic ray 10 on the first surface as h, a distance between the object O and the vertex of the first surface as s, a distance between the vertex of the second surface and the image I as s', an axial thickness of the lens as d, and a distance between the first surface and the entrance pupil of the lens as EP.

Since, in general, the medium for the acoustic lens is lower in refractive index than the liquid such as water, an imaging lens assumes the configuration of a negative lens whose periphery is larger in thickness than the axial portion. In the following, the characteristics of such an acoustic lens will be discussed by citing simple examples.

(1) Total Reflection

The total reflection of acoustic waves on the lens surface of the acoustic lens system is first discussed.

Figure 4:
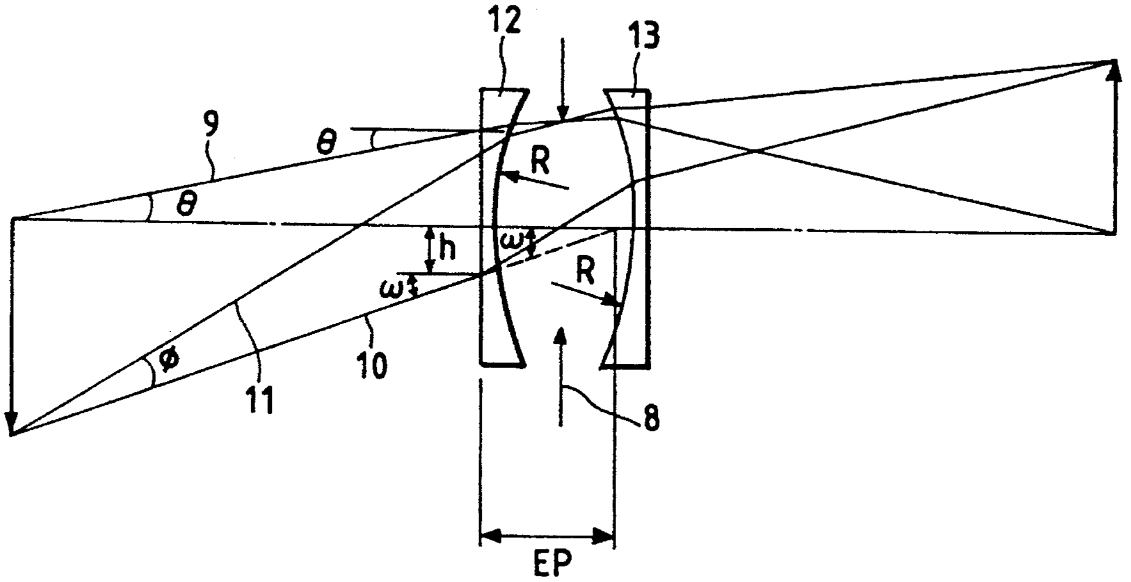

The configuration of the acoustic lens can be broadly classified into two types. That is, one is the lens having the concave surfaces of large curvature on the sides of the object and image points shown in FIG. 3, and the other is such that, as shown in FIG. 4, the acoustic lens system is composed of a plurality of lenses whose surfaces directed toward each other assume the concave shapes of large curvature and whose surfaces on the object and image point sides are plane surfaces or moderately curved surfaces.

Figure 5:
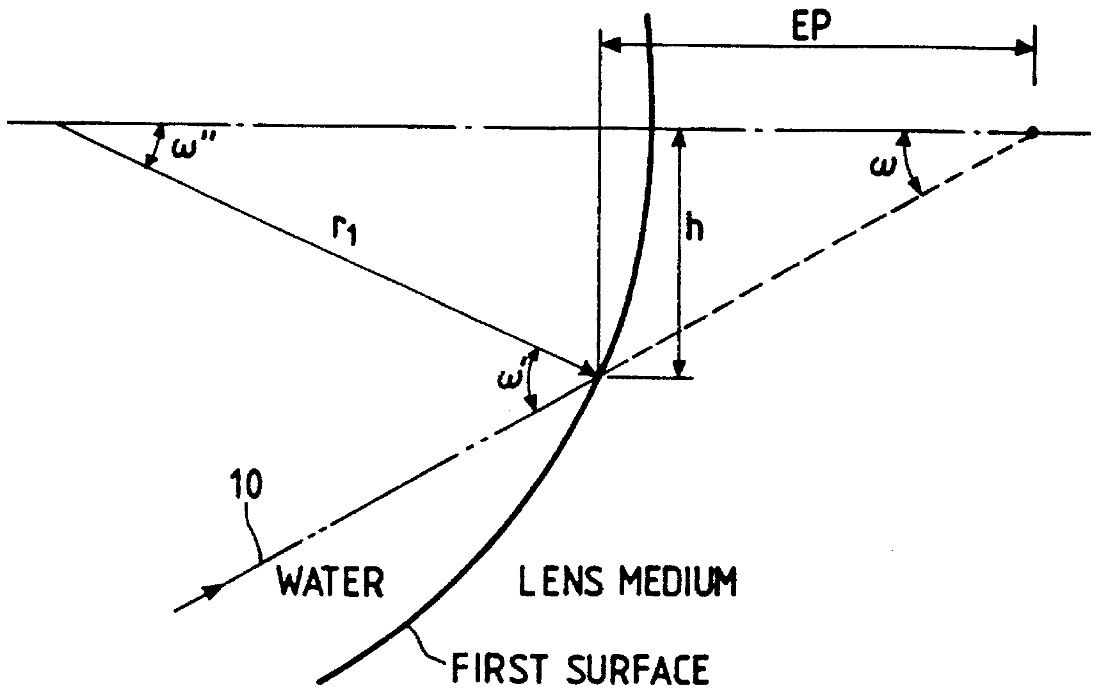

First of all, a description will be made of FIG. 3. With the lens of this type, when the angle of view increases, the acoustic beam contributive to off-axis image formation is decreased by the total reflection at the lens surface and off-axis imaging performance is deteriorated by the effect of diffraction. In order to insure good performance, it is required that at least half of the acoustic beam capable of passing through the acoustic beam stop reaches the image surface. As such, an arrangement must be made so that the off-axis principal acoustic ray is not lost, at least, by the total reflection. FIG. 5 shows an enlarged view of a portion adjacent to the entrance surface of the acoustic lens 7. In order to fulfill the above requirement, when an incident angle on the first surface of the off-axis principal acoustic ray is represented by ω', the velocity of sound in the acoustic lens by $v_1$, and the velocity of sound in the medium on the emergence side of the acoustic lens by $v_0$, the condition must be satisfied that $$\omega' < \sin^{-1}(v_0/v_1) \quad (2)$$

That is, if this condition is rewritten by using the angle of view, it will be necessary to satisfy $$\omega + \sin^{-1}(h/r_1) < \sin^{-1}(v_0/v_1) \quad (3)$$

When $h<r_1$, the second term on the left side is negligible and the condition is given by $$\omega < \sin^{-1}(v_0/v_1) \quad (4)$$

Further, in the case where the arrangement is made so that the off-axis marginal acoustic ray 11 also is not totally reflected, it is necessary only to satisfy the condition $$\omega - \phi + \sin^{-1}(h/r_1) < \sin^{-1}(v_0/v_1) \quad (5)$$

For the on-axis acoustic beam, on the other hand, the principal acoustic ray coincides with the axis of the lens, so that in Equation (5), ω=0 may be placed and φ may be replaced by θ. That is, it is necessary only to satisfy the condition $$\sin^{-1}(h/r_1) - \theta < \sin^{-1}(v_0/v_1) \quad (6)$$

The on-axis acoustic ray such that the angle θ does not satisfy this condition will be lost by the total refection at the lens surface.

Next, the acoustic lens depicted in FIG. 4 is explained. It is assumed that the space between two lenses 12 and 13 is filled with the same medium as for an object space and an image space.

In the acoustic lens of the type, since the radius of curvature $r_1$ of the first surface is larger, $\sin^{-1}(h/r_1)$ in Equation (3) becomes smaller and the angle ω can be increased accordingly with respect to $\sin^{-1}(v_0/v_1)$, with the result that this type is more advantageous to a wide angle. For the on-axis acoustic ray, however, it is required that the angle θ is made smaller in accordance with the decrease of $\sin^{-1}(h/r_1)$, so that this lens is detrimental to a large aperture. It is therefore necessary to determine what condition of Equations (3), (5) and (6) is satisfied in accordance with the angle of view and the aperture ratio which are required and select the shape and material of the lens accordingly.

(2) Attenuation

Next, discussion is made as to the attenuation of acoustic waves in the lens. In general, the attenuation of acoustic waves in the lens medium is remarkable as compared with that in the liquid, such as water, filled outside the lens. It is therefore desirable that the lens attains the smallest possible thickness.

Figure 6:
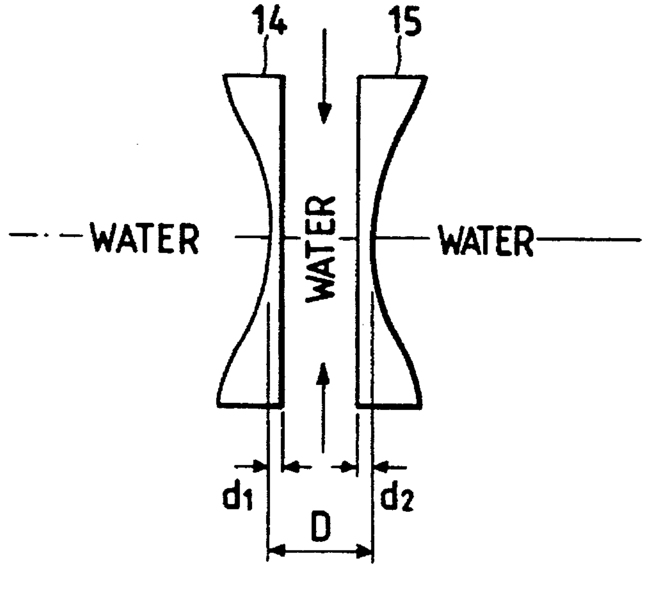
FIG. 6 is a view showing the structure of the acoustic lens in which the attenuation of acoustic waves diminishes.

In FIG. 6, portions 14 and 15 corresponding to thicknesses $d_1$ and $d_2$ adjacent to the first and second surfaces, respectively, of the lens shown in FIG. 3 remain as they are and the middle portion of the lens is removed so as to be filled with a substance such as water in which the attenuation of acoustic waves is slight. Thus, by replacing a part of the material constituting the lens with the substance of lower attenuation of acoustic waves, the attenuation of acoustic waves can be diminished without affecting materially the imaging performance. Practically, the thickness of each lens element may as well be determined so that the ratio of the lens medium occupied in the overall length of the acoustic lens system (namely, an axial distance from the surface nearest the object to the surface nearest the image) is less than one-half of the over length, that is, so that when the over length of the lens system is represented by D and an axial thickness of each lens element composing the lens system by $d_i$ (i=1, 2, . . . in order from the object side), the condition is satisfied that $$D/2 > \Sigma d_i \quad (7)$$

(3) Correction For Aberration

Subsequently, aberrations of the acoustic lens are explained. It is of importance that a lens system having the angle of view is favorably corrected for aberrations at both the on-axis and off-axis positions. First, spherical aberration is described.

Referring now to the lens of the type shown in FIG. 3 as a model, let us determine the condition of correction for the spherical aberration. For simplicity, the lens is assumed to be a symmetric type ($r_1=-r_2$) and −1x (s=−s') in imaging magnification. When $v_0/v_1=n$, the height of incidence on the first surface of the on-axis marginal acoustic ray is denoted by $h_M$, and the focal length of the acoustic lens by f, the spherical aberration of the lens Δ (1/S') is given by $$\Delta(1/S') = (h^2/f^3)\,(Aq^2 + Bqp + Cp^2 + D) \quad (8)$$

where A, B, C and D are coefficients determined by the refractive index of the lens medium, and q is the shape factor and p is the position factor, which are respectively defined by $$q = (r_2 + r_1)/(r_2 - r_1) \quad (9)$$

$$p = (s' + s)/(s' - s) \quad (10)$$

Since q=p=0 from the conditions of $r_1=-r_2$ and s=−s', the spherical aberration is given by $$\Delta(1/S') = (h^2/f^3)D \quad (11)$$

The coefficient D is expressed by the refractive index as $$D = n^2/8(n-1)^2 \quad (12)$$

If the aperture ratio and the focal length of the lens are constant, $(h^2/f^3)$ is a constant (which is represented by E), so that the spherical aberration comes to $$\Delta(1/S') = n^2/8(n-1)^2 E \quad (13)$$

Figure 7:
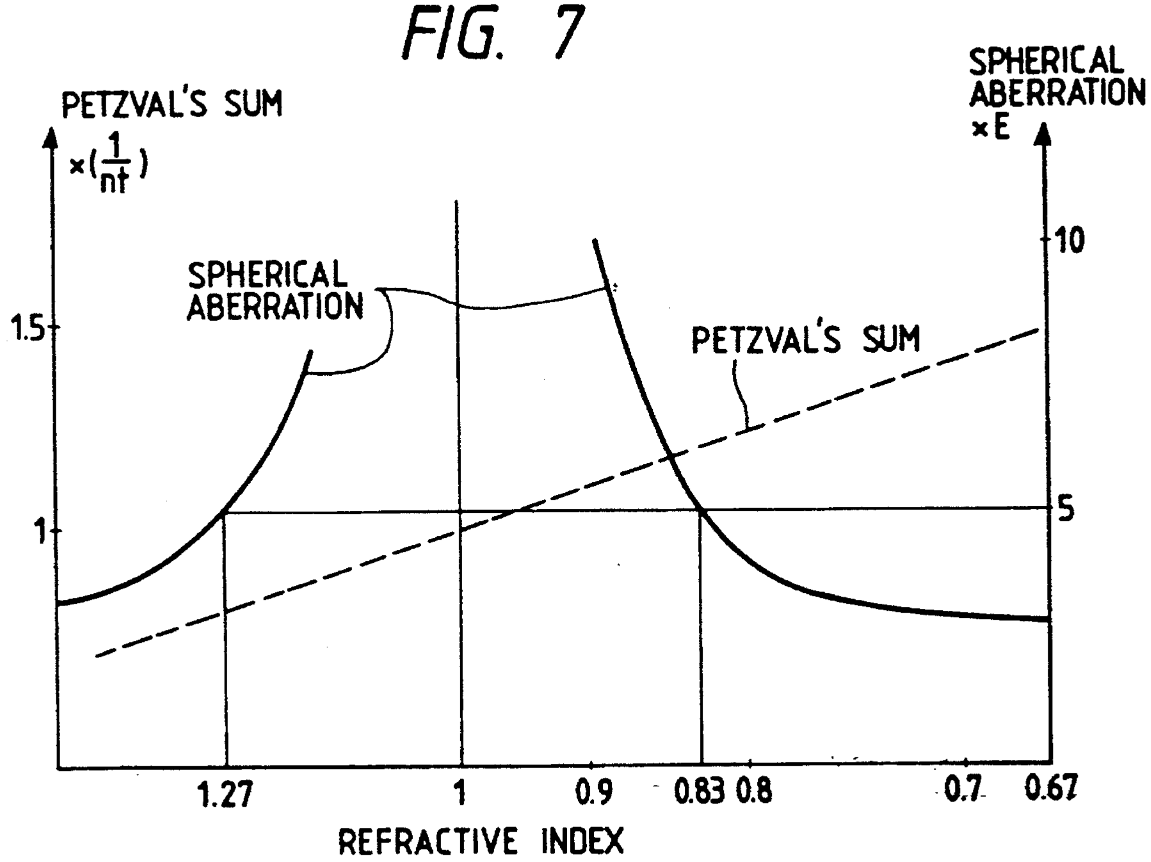
FIG. 7 is a graph showing the magnitudes of aberration and the Petzval's sum produced in the acoustic lens.

FIG. 7 graphs Equation (13) by plotting the spherical aberration along the ordinate on the right side, the Petzval's sum along the ordinate on the left side, and the refractive index along the abscissa. As will be obvious from this diagram, when the refractive index approaches 1, the spherical aberration rapidly increases. On the assumption that Δ(1/S')=5E is approximately practical limit, if selection is made of the medium such as to satisfy the condition $$n \leqq 0.83 \text{ or } 1.27 \leqq n \quad (14)$$

the acoustic lens favorably corrected for the spherical aberration can be secured. Contrary, if the refractive index approaches an ambient medium in excess of the range of the foregoing condition, the spherical aberration will increase to reduce the resolution.

Next, off-axis aberrations are explained. Of the off-axis aberrations, the biggest problem is posed by curvature of field. Although actual curvature of field is divided into the magnitude of the Petzval's sum and astigmatism, the Petzval's sum can be approximately regarded as a measure for determining the curvature of field.

The model shown in FIG. 3 is now considered like the case of the discussion on the spherical aberration. For simplicity, when the thickness d of the lens is denoted by 0 in FIG. 3, the Petzval's sum $P_s$ of the lens is given by $$P_s = (1-1/n)(1/r)-(1/n-1)(1/r) = (2/r)(1-1/n) \quad (15)$$

However, it is assumed that $r_1=-r_2=r$. The focal length f of the lens is $$1/f=2(n-1)/r \quad (16)$$

and, from Equations (15) and (16), the Petzval's $P_s$ is rewritten as $$P_s=1/nf \quad (17)$$

It is thus seen that the Petzval's sum is inversely proportional to the refractive index of the lens medium.

Turning to FIG. 7 again, it is seen that where the refractive index of the lens is smaller than that of the ambient medium, the direction in which the spherical aberration decreases coincides with that of increase of the Petzval's sum. It is therefore desirable that the balance between the spherical aberration and the flatness of an image surface is taken into account for the selection of the lens medium. Also, in order to prevent the reduction of the resolution attributable to the curvature of field, it may be required that ultrasonic elements are arrayed on a curved surface with respect to a plane normal to the axis.

Table 2 shows, as a list, the aberrations produced when the lens is constructed by media with various refractive indices, the radii of curvature of the lens surface, and the angles of total reflection at the lens surface, under the conditions that the lens is placed in water which is specified at the focal length F=100, the axial thickness d=20, the magnification m=−1, the F number=F/9.8, and the image height I=10.

TABLE 2

| | PS Petzval's sum | Ms Spherical aberration | DS | DM | R | Angle of total reflection (°) |
|---|---|---|---|---|---|---|
| 0.508 (3000) | 0.147 | −0.49 | −1.79 | −3.16 | 87.51 | 30.5 |
| 0.5588 | 0.1323 | −0.743 | −1.69 | −3.07 | 79.47 | 33.9 |
| 0.6696 | 0.108 | −1.935 | −1.54 | −2.99 | 60.71 | 42.03 |
| 0.7112 | 0.101 | −2.867 | −1.515 | −3.015 | 53.36 | 45.3 |
| 0.762 | 0.094 | −4.853 | −1.506 | −3.09 | 44.24 | 49.64 |
| 0.82 | 0.087 | −9.77 | −1.543 | −3.310 | 33.67 | 55.08 |
| 0.87 (1751) | 0.082 | −20.754 | −1.66 | −3.736 | 24.41 | 60.46 |

DS: the position of the sagittal imaging point, DM: the position of the meridional imaging point Although the foregoing consideration is related to the lens of the type shown in FIG. 3, the lens different in shape may also be considered to exhibit the same tendency. Specifically, since the relationship of q=p=0 is not established in general and even in such a case, the spherical aberration is such that the last term D is added to the minimum value of the term including q and p in Equation (8), the tendency of the spherical aberration regarding the term D analyzed in the above description remains as it is. As for the curvature of field, since the Petzval's sum depends on the focal length and refractive index of the lens only by simplifying the equation as $r_1=-r_2=r$, it follows that the result mentioned above applies to any case.

(4) Introduction of Aspherical Surface

The fundamental construction of the acoustic lens is determined by the consideration described in items (1) to (3) and, in order to further improve the imaging performance, discussion is made as to that the lens surface is made aspherical. Since the aspherical surface under present discussion is limited to one which is rotationally symmetric with respect to the axis of the lens, the configuration of the aspherical surface can be sufficiently regarded as a curve in a plane surface. To simplify the explanation in this case also, the aspherical surface is to be expressed by the following equation. That is, when the z axis is taken along the axis of the lens, the y axis is taken perpendicular to the z axis, and the radius of the circle contacting with the y axis at the origin is represented by r, the relationship between them is given by $$(z-r)^2+y^2=r^2 \quad (18)$$

and when this is solved in respect of z, z is expressed as $$z=y^2/2r+y^4/8r^3+\ldots \quad (19)$$

Thus, the aspherical surface slightly shifted from this circle, in which the radius of curvature at the vertex is taken as r and the parameter indicative of the degree of asphericity as δ, is to be expressed as $$z=y^2/2r+(y^4/8r^3)(1-\delta)+\ldots \quad (20)$$

Where the aspherical surface is a quadric surface, the parameter δ becomes the square of eccentricity, in which a hyperbola is formed at $\delta<-1$, a parabola at $\delta=-1$, an ellipse taking the z axis as the major axis at $-1<\delta<0$, a circle at $\delta=0$, and an ellipse taking the z axis as the minor axis at $0<\delta$.

Here, referring again to the lens shown in FIG. 3 as a model, let us consider the correction for the spherical aberration. When the velocity of sound in the medium on the incidence side of the aspherical surface is newly taken as $v_0$, the velocity of sound in the medium on the emergence side as $v_1$, and the relative refractive index as $n_1=v_0/v_1$, the introduction of such an aspherical surface as is stated above yields new spherical aberration represented by $$-y^2\delta(1-n_1)/2r^3 \quad (21)$$

Thus, by adding this composition to Equation (13) and substituting Equation (16) for E in Equation (13), the spherical aberration of the entire lens is defined as $$\Delta(1/S')=(n-1)y^2/2n^2r^3-y^2\delta(1-n_1)/2r^3 \quad (22)$$

The condition of complete correction for the spherical aberration which is obtained by the introduction of the aspherical surface is $\Delta(1/S')=0$, so that the solution of Equation (21) regarding δ under this condition gives $$\delta=-(1/n_1)^2 \quad (23)$$

that is, $$\delta=-(v_1/v_0)^2 \quad (24)$$

Figure 8:
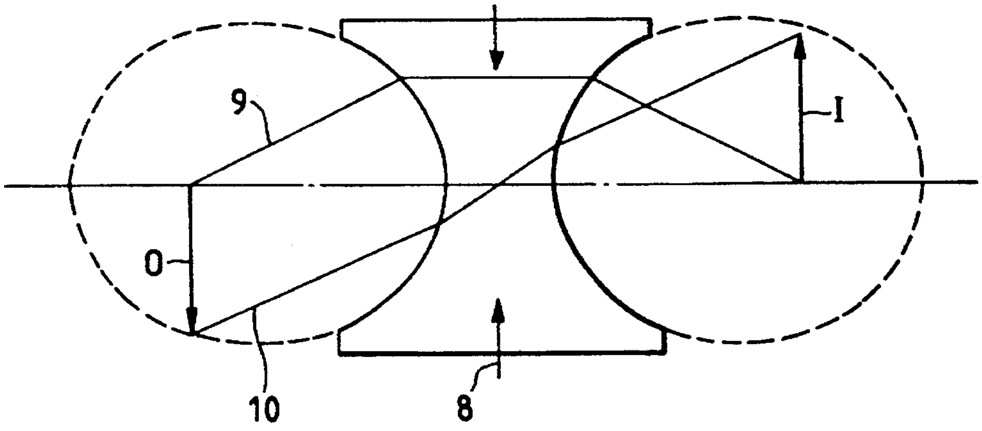
FIGS. 8 to 10 are views showing the configurations of aspherical surfaces used in the acoustic lens.

In the model, because $v_1<v_0$, $-1<\delta<0$ and each aspherical surface assumes the shape of the ellipse taking the axis of the lens system as the major axis as depicted in FIG. 8.

Figure 9:
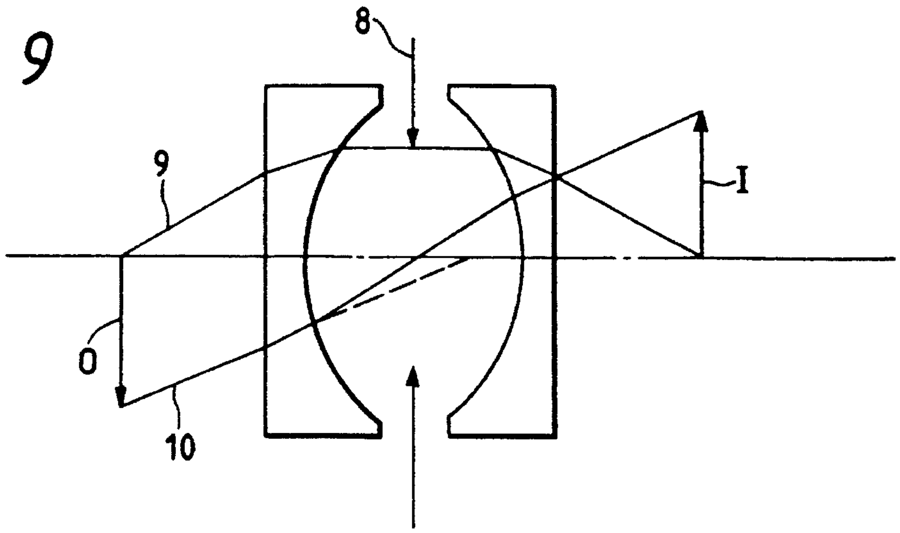

In the lens of the type shown in FIG. 4, on the other hand, $v_1>v_0$ at the surfaces of the lens elements directed to each other between which the stop is sandwiched and therefore $\delta<-1$, with the result that the aspherical surfaces have the shape of the hyperbola shown in FIG. 9.

As seen from FIG. 8, the lens system of the type, which in numerous cases, makes small an angle made by the axis with the tangent of the surface at a distance from the axis, is liable to produce the total reflection in respect of the off-axis acoustic beam and is not necessarily suited to the lens system with a large angle of view.

The lens of the type shown in FIG. 9, unlike that in FIG. 8, makes rarely small the angle made by the axis with the tangent of the surface at a distance from the axis, so that there is no fear of generation of the total reflection and the spherical aberration can be corrected by the introduction of the aspherical surface.

(5) General Consideration of Lens Configuration

For the curvature of field, although the astigmatism can be corrected by the use of the aspherical surface, the correction for the Petzval's sum is impossible. It follows from this that when an actual lens design is made with consideration for the correction for aberrations, the fundamental configuration of the lens system is first determined so that the Petzval's sum diminishes, and then the aspherical surface is introduced thereinto to make the correction for the spherical aberration and the astigmatism.

In the shapes of the aspherical surfaces, it is desirable that in consideration of the correction of the spherical aberration, an ellipsoid taking the axis of the lens system as the major axis is formed on the incidence side of the acoustic lens and a hyperboloid on the emergence side. The latter, which assumes the shape such that the curvature moderates progressively in separating from the axis, is preferable because it has the function of offsetting the curvature of field by minus astigmatism produced in a spherical system and is such that both the aberrations can be corrected at once. The former has the same behavior, but if the curvature on the axis is equal with that of the latter, the degree of moderation of the curvature in separating from the axis will be low and, as a result, the function of the correction for the astigmatism is inferior to that of the latter.

From the foregoing, it will be seen that in the case of a small angle of view, the selection of the lens system of the type in FIG. 8 is advisable because as stated in relation to the total reflection, it is possible to increase the numerical aperture and secure the lens system in which the deterioration of the resolution caused by diffraction is minimized. In the case of a large angle of view, however, the selection of the lens system of the type in FIG. 9 is more advantageous because the total reflection is little produced and the correction for the astigmatism is made with great ease.

Figure 10:
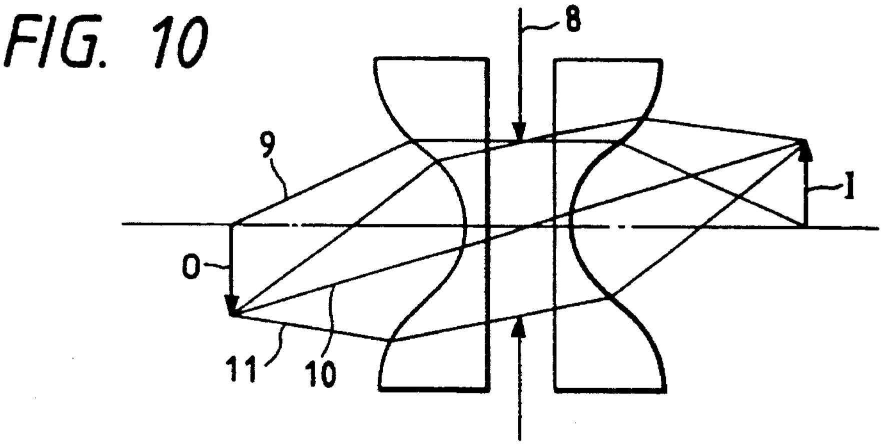

Also, in the case where it is intended that the lens system with the angle of view in some extent is attained by using the lens of the type in FIG. 8, it is desirable for the prevention of the total reflection that as illustrated in FIG. 10, the angle made by the axis with the surface is increased on the outside from the vicinity of the position through which the on-axis marginal acoustic ray passes. Since such a shape of the surface contributes also to the correction for the curvature of field by the astigmatism, it is desirable even in this view.

Figure 11:
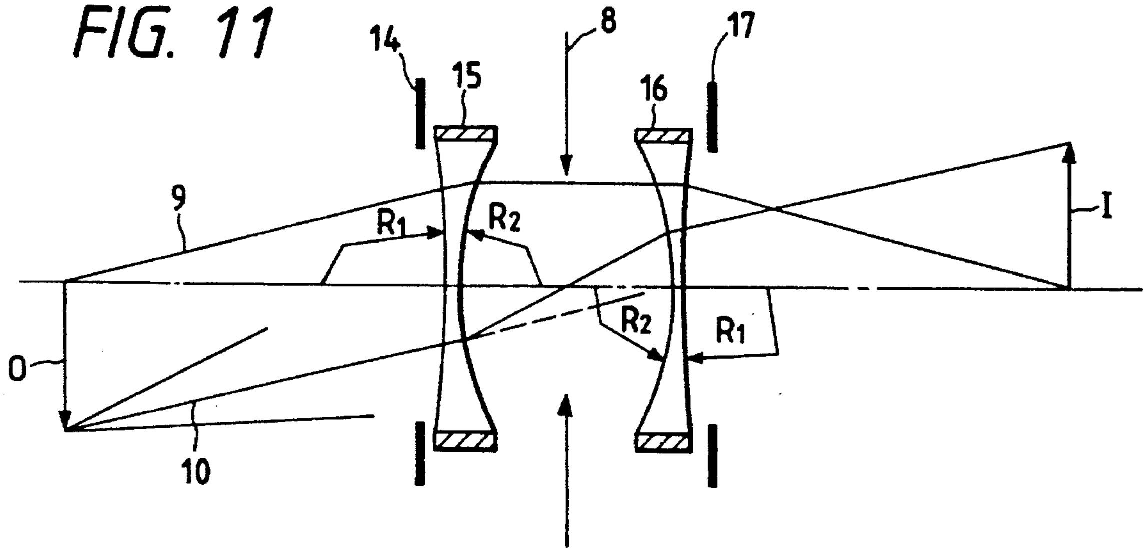
FIG. 11 is a view showing the structure of the acoustic lens provided with stray acoustic beam stops and acoustic materials.

Now, as the combination of the merits of the lens systems in FIGS. 8 and 9, the lens system of the type such as is shown in FIG. 11 is available. It is adapted to have moderate curvature at the surfaces on opposite sides of the acoustic beam stop in the lens system shown in FIG. 4. Specifically, it is designed so that these surfaces are provided with the curvature to such a degree that it does not adversely affect the total reflection to have the effect of increasing the numerical aperture and a principal portion of an imaging function is borne by the surfaces directed toward the aperture stop. With this shape, there is no fear that the total reflection is produced even in the case where the surface on the incidence side is configured as the ellipsoid in order to make the correction for the spherical aberration, and the angle of view and the numerical aperture can be increased. In addition, if the surface on the emergence side is taken as the hyperboloid, the correction for aberrations can be more favorably made. For this purpose, it is required that the radius of curvature of one surface directed toward the acoustic beam stop of the lens is smaller than that of the other surface opposite thereto, that is, the following conditions are satisfied:

$$R_2<R_1 \qquad (25)$$

$$R_3<R_4$$

Also, in the lens system composed of a large number of acoustic lenses, the thicknesses of acoustic beams incident on individual acoustic lenses and the incident angles are various, independently of the angle of view and the numerical aperture of the entire lens system, so that it is necessary to discuss a dimensional relationship between the radii of curvature of individual surfaces in accordance with the position of the lens, based on the previous analysis. For the lens located, at least, nearest the object, however, it is highly desirable that the above conditions are satisfied in order to increase both the numerical aperture and the angle of view. Further, in the case of the lens system comprised of a large number of acoustic lenses, it is only necessary to determine the radii of curvature of the surfaces so that when the average of the radii of curvature of the surfaces which assume concave shapes toward the acoustic beam stop is represented by $R_0$ and the average of the radii of curvature of the surfaces which assume convex shapes toward the acoustic beam stop by $R_T$, the following relationship is satisfied:

$$R_0<R_T \qquad (26)$$

This can be more commonly expressed as follows: That is, it is that when the refracting powers of the concave and convex surfaces directed toward the acoustic beam stop are taken as $P_{oi}$ and $P_{Tj}$, respectively, and the distances from these surfaces to the acoustic beam stop as the absolute values of $d_{oi}$ and $d_{Tj}$, respectively, the following condition is satisfied:

$$\Sigma P_{oi} d_{oi}>\Sigma P_{Tj} d_{Tj} \qquad (27)$$

This meaning is nothing for it but to enhance the weights of the concave surfaces directed to the stop.

. The above description of the lens system shown in FIG. 8 applies also, as it is, to the case where the middle portion of the lens is removed as in FIG. 6. In short, the type of the lens shown in FIG. 8 means that the surface directed toward the object point or the image point is greater in curvature than the surface opposite thereto.

(6) Antireflection

Next, a description will be made of the antireflection of acoustic waves on the surface of the acoustic lens. On the surface of the acoustic lens are produced reflection waves, apart from the total reflection, attributable to the difference of acoustic impedance with the ambient medium, which give rise to a noise. It is, therefore, necessary to reduce surface reflection as far as possible. For this purpose, the antireflection film comprised of a single layer or a multilayer is provided on the surface of the acoustic lens. When the acoustic impedance of the lens medium is represented by $Z_L$, the acoustic impedance of the ambient medium of the acoustic lens by $Z_W$, the acoustic impedance of the antireflection film by $Z_1$, $Z_2$, . . . in order from the layer near the acoustic lens in the case where the film is comprised of a plurality of layers, and the thickness of each layer by λ/4 (where λ is the wavelength of the ultrasonic wave being used), the following relationships are established:

(a) When the antireflection film is a single layer, $$Z1=\sqrt{ZWZL} \tag{28}$$

(b) When the antireflection film is two layers, $$Z1=\sqrt[4]{ZWZL^3} \tag{29}$$

$$Z2=\sqrt[4]{ZW^3ZL}$$

(c) When the antireflection film is three layers, $$Z1/ZL=\sqrt[8]{ZW/ZL} \tag{30}$$

$$Z2/ZL=\sqrt[8]{(ZW/ZL)^4}$$

$$Z3/ZL=\sqrt[8]{(ZW/ZL)^7}$$

For materials of the antireflection film, polyethylene, polyimide, PVDF, polyester, and a mixture of epoxy resin and the powder of tungsten and the like are available. It is only necessary to bond these synthetic resins to the lens surface through the process of thermo-compression bonding, high-frequency fusing, coating, casting, etc. Although the acoustic impedance is completely transduced from $Z_W$ to $Z_L$ at the frequency such that the thickness of each antireflection film just reaches λ/4, complete matching is not obtained as deviated from the frequency and consequently reflectance increases. The frequency band low in reflectance is widened as the antireflection film is formed into the multilayer. In the ultrasonic system, it is necessary to employ ultrasonic pulses having a wide frequency band for improving what is called distance resolution (ability to discriminate an axial position of the object) and therefore the provision of the antireflection film has a much significant meaning compared with a mere preventive of the loss of the acoustic beam. Let us take a concrete example in the case where the antireflection film is composed of the single layer under the condition that the acoustic lens made of polystyrene is used in water. Since $Z_L$ (polystyrene)= $2.39\times10^6$(kg/m$^2$s) and $Z_W$ (water)=$1.52\times10^6$(kg/m$^2$s), it follows from the above equation that $Z_1=1.91\times10^6$ (kg/m$^2$s). Polyethylene has the value of $Z_1=1.92\times10^6$ (kg/m$^2$s), so that it is only necessary to bond a sheet of polyethylene having the thickness equal to ¼ of the wavelength of the central frequency of ultrasonic waves for use to the lens surface by the process of the thermo-compression bonding or the use of an adhesive.

Also, in order to facilitate the bonding of the antireflection film, it is desirable that the radius of curvature of each lens surface is made as great as possible.

(7) Elimination of Stray Acoustic Beam

Finally, a description will be made of the elimination of a stray acoustic beam. Here, the term "stray acoustic beam" indicates acoustic rays which are usually produced at the surface of the acoustic lens by reflection and the like and reach a detecting element through a course different from the case of original acoustic rays contributing to the image formation. Since such acoustic rays come to the noise in signals to be detected, the elimination of the stray acoustic beam is of importance in order to improve the S/N ratio of the ultrasonic system.

For the methods of eliminating the stray acoustic beam, it is considered that (a) the acoustic rays which may give rise to reflecting waves at the surface and periphery of the acoustic lens are removed in advance before entering the lens system, (b) the reflection of acoustic waves in the lens system is diminished, and (c) the stray acoustic beam produced in the lens system is removed before reaching the image surface.

For (a) among these techniques, it is effective, as depicted in FIG. 11, to provide a stray acoustic beam stop 14 constructed by the material which does not reflect the acoustic waves, such as an acoustic material, on the incidence side of the lens system. In (b), on the other hand, although the above antireflection film also contributes to this case, it is possible, as further depicted in FIG. 11, to provide acoustic materials 15 and 16 on the peripheries of the elements of the acoustic lens to reduce the production of the stray acoustic beam at these surfaces. As for (c), the acoustic beam stop 8 of the lens system and a stray acoustic beam stop 17 provided on the emergence side function effectively.

Now, the embodiments according to the present invention will be described in detail below.

In each embodiment, the aspherical surface is used and is expressed by the following equation when the x axis is taken along the axis of the lens system, the y axis is taken perpendicular to the x axis, and the intersection of the x axis with the aspherical surface is taken as the origin:

$$X=Cy^2/(1+\sqrt{1-PC^2y^2})+\Sigma A2jy^{2j}$$

wherein C is the radius of curvature on the axis of the aspherical surface, P is the constant of the cone, and $A_{2j}$ is the 2j order aspherical coefficient. In the case where $A_{2j}$ is zero in all, the above equation is indicative of the spherical surface.

Embodiment 1 f = 81.27, F/2.8, ω = 7°

| | | |
|---|---|---|
| r0 = ∞ (Object) | d0 = 150 | n0 = 1 |
| r1 = −49.5606 (*) | d1 = 7.7492 | n1 = 0.6696 |
| r2 = ∞ (Aperture stop) | d2 = 7.7492 | n2 = 0.6696 |
| r3 = 49.5606 (*) | d3 = 150 | n3 = 1 |

-continued r4 = $\infty$ (Image)
$P^{(1)} = 0.5515$, $A2j^{(1)} = 0$ (j = 1, 2, . . )
$P^{(3)} = 0.5515$, $A2j^{(3)} = 0$ (j = 1, 2, . . )
$\beta = 1$, v0/v1 = 0.6696, PS = 0.1079

Embodiment 2 f = 77.91, F/1.64, $\omega = 4.6°$

| | | |
|---|---|---|
| r0 = $\infty$ (Object) | d0 = 150 | n0 = 1 |
| r1 = −49.5606 (*) | d1 = 3.7529 | n1 = 0.6696 |
| r2 $\infty$ (Aperture stop) | d2 = 3.7929 | n2 = 0.6696 |
| r3 = 49.5606 (*) | d3 = 150 | n3 = 1 |
| r4 = $\infty$ (Image) | | |

$P^{(1)} = 0.5516$, $A2j^{(1)} = 0$ (j = 1, 2, . . )
$P^{(3)} = 0.5516$, $A2j^{(3)} = 0$ (j = 1, 2, . . )
$\beta = 1$, v0/v1 0.6696, PS 0.1032

Embodiment 3 f = 76.48, F/1.64, $\omega = 4.6°$

| | | |
|---|---|---|
| r0 = $\infty$ (Object) | d0 = 150 | n0 = 1 |
| r1 = −49.5606 (*) | d1 = 1.0 | n1 = 0.6696 |
| r2 = $\infty$ | d2 = 1.4098 | n2 = 1 |
| r3 = $\infty$ (Aperture stop) | d3 = 1.4098 | n3 = 1 |
| r4 = $\infty$ | d4 = 1.0 | n4 = 0.6696 |
| r5 = 49.5606 (*) | d5 = 150 | n5 =1 |
| r6 = $\infty$ (Image) | | |

$P^{(1)} = 0.5516$, $A2j^{(1)} = 0$ (j = 1, 2, . . )
$P^{(5)} = 0.5516$, $A2j^{(5)} = 0$ (j = 1, 2, . . )
$\beta = 1$, v0/v1 0.6696, PS 0.102

Embodiment 4 f = 99.02, F/3.28, $\omega = 9°$

| | | |
|---|---|---|
| r0 = $\infty$ (Object) | d0 = 150 | n0 = 1 |
| r1 = $\infty$ | d1 = 1.0 | n1 = 0.6696 |
| r2 = 50.054 (*) | d2 = 35.6063 | n2 = 1 |
| r3 = $\infty$ (Aperture stop) | d3 = 35.6063 | n3 = 1 |
| r4 = −50.054 (*) | d4 = 1.0 | n4 = 0.6696 |
| r5 = $\infty$ | d5 = 150 | n5 = 1 |
| r6 = $\infty$(Image) | | |

$P^{(2)} = 1.0$ $A4^{(2)} = -0.19761 \times 10^{-5}$
$A6^{(2)} = -0.15835 \times 10^{-10}$
$A8^{(2)} = -0.21668 \times 10^{-12}$
$P^{(4)} = 0.5516$ $A4^{(4)} = -0.19761 \times 10^{-5}$
$A6^{(4)} = -0.15835 \times 10^{-10}$
$A8^{(4)} = -0.21668 \times 10^{-12}$
$\beta = 1$, v0/v1 = 0.6696, PS = 0.13

Embodiment 5 f = 128.84, F/1.64, $\omega = 4.6°$

| | | |
|---|---|---|
| r0 = $\infty$ (Object) | d0 = 150 | n0 = 1 |
| r1 = $\infty$ | d1 = 1.0 | n1 = 0.6696 |
| r2 = 50.054 (*) | d2 = 62.4276 | n2 = 1 |
| r3 = $\infty$ (Aperture stop) | d3 = 62.4276 | n3 = 1 |
| r4 = −50.054 (*) | d4 = 1.0 | n4 = 0.6696 |
| r5 = $\infty$ | d5 = 150 | n5 = 1 |
| r6 = $\infty$ (Image) | | |

$P^{(2)} = -1.1465$, $A2j^{(2)} = 0$ (j = 1, 2, . . )
$P^{(4)} = -1.1465$, $A2j^{(4)} = 0$ (j = 1, 2, . . )
$\beta = 1$, v0/v1 = 0.6696, PS 0.169

Embodiment 6 f = 94.23, F/2.624, $\omega = 9.2°$

| | | |
|---|---|---|
| r0 = $\infty$ (Object) | d0 = 150 | n0 = 1 |
| r1 = −210.6938 (*) | d1 = 1.0 | n1 = 0.762 |
| r2 = 43.2951 (*) | d2 = 29.7350 | n2 = 1 |
| r3 = $\infty$ (Aperture stop) | d3 = 29.7350 | n3 = 1 |
| r4 = −43.2951 (*) | d4 = 1.0 | n4 = 0.762 |
| r5 = 210.6938 (*) | d5 = 150 | n5 = 1 |
| r6 = $\infty$ (Image) | | |

$P^{(1)} = 1.0$ $A4^{(1)} = -0.10332 \times 10^{-5}$
$A6^{(1)} = -0.14884 \times 10^{-8}$
$A8^{(1)} = -0.126663 \times 10^{-11}$
$P^{(2)} = 1.0$ $A4^{(2)} = -0.34938 \times 10^{-5}$
$A6^{(2)} = -0.12802 \times 10^{-8}$
$A8^{(2)} = -0.66805 \times 10^{-12}$
$P^{(4)} = 1.0$ $A4^{(4)} = 0.34938 \times 10^{-5}$
$A6^{(4)} = 0.12802 \times 10^{-8}$
$A8^{(4)} = -0.66805 \times 10^{-12}$
$P^{(5)} = 1.0$ $A4^{(5)} = 0.10332 \times 10^{-5}$
$A6^{(5)} = 0.14884 \times 10^{-8}$ -continued $A8^{(5)} = -0.12663 \times 10^{-11}$
$\beta = 1$, v0/v1 = 0.762, PS = 0.1092

Embodiment 7 f = 94.917, F/3.28, $\omega = 9.2°$

| | | |
|---|---|---|
| r0 = $\infty$ (Object) | d0 = 150 | n0 = 1 |
| r1 = −214.8905 (*) | d1 = = 1.0 | n1 = 0.762 |
| r2 = 43.1245 (*) | d2 = 30.6147 | n2 = 1 |
| r3 = $\infty$ (Aperture stop) | d3 = 30.6147 | n3 = 1 |
| r4 = −43.1245 (*) | d4 = 1.0 | n4 = 0.762 |
| r5 = 214.8905 (*) | d5 = 150 | n5 = 1 |
| r6 = $\infty$ (Image) | | |

$P^{(1)} = 1.0$ $A4^{(1)} = -0.14141 \times 10^{-5}$
$A6^{(1)} = -0.84857 \times 10^{-8}$
$A8^{(1)} = 0.17072 \times 10^{-11}$
$P^{(2)} = 1.0$ $A4^{(2)} = -0.36820 \times 10^{-5}$
$A6^{(2)} = -0.14204 \times 10^{-8}$
$A8^{(2)} = 0.16844 \times 10^{-11}$
$P^{(4)} = 1.0$ $A4^{(4)} = 0.36820 \times 10^{-5}$
$A6^{(4)} = 0.14204 \times 10^{-8}$
$A8^{(4)} = -0.16844 \times 10^{-11}$
$P^{(5)} = 1.0$ $A4^{(5)} = 0.14141 \times 10^{-5}$
$A6^{(5)} = 0.84847 \times 10^{-8}$
$A8^{(5)} = -0.17072 \times 10^{-11}$
$\beta = 1$, v0/v1 = 0.762, PS = 0.11

Embodiment 8 f = 126.03, F/3.677, $\omega = 14.5°$

| | | |
|---|---|---|
| r0 = $\infty$ (Object) | d0 = 190 | n0 = 1 |
| r1 = $\infty$ (Stray acoustic beam stop) | d1 = 5.0 | n1 = 1 |
| r2 = −136.0629 (*) | d2 = 12.9965 | n2 = 0.6696 |
| r3 = 176.3437 | d3 = 33.5424 | n3 = 1 |
| r4 = $\infty$ (Aperture stop) | d4 = 23.0486 | n4 = 1 |
| r5 = −77.0553 | d5 = 12.9977 | n5 = 0.6696 |
| r6 = 287.8483 (*) | d6 = 10.0 | n6 = 1 |
| r7 = $\infty$ (Stray acoustic beam stop) | d7 = 188.259 | n7 = 1 |
| r8 = $\infty$ (Image) | | |

$P^{(2)} = 1.0$ $A4^{(2)} = 0.84461 \times 10^{-6}$
$A6^{(2)} = 0.94866 \times 10^{-12}$
$P^{(6)} = 1.0$ $A4^{(6)} = -0.18899 \times 10^{-6}$
$A6^{(6)} = -0.317 \times 10^{-10}$
$\beta = 1$, v0/v1 = 0.6696, PS = 0.122

Embodiment 9 f = 128.08, F/2.872, $\omega = 13.5°$

| | | |
|---|---|---|
| r0 = $\infty$ (Object) | d0 = 160 | n0 =1 |
| r1 = $\infty$ (Stray acoustic beam stop) | d1 = 1.0 | n1 = 0.6696 |
| r2 = 95.0930 (*) | d2 = 28.491 | n2 = 1 |
| r3 = $\infty$ | d3 = 1.0 | n3 = 0.762 |
| r4 = 94.6677 (*) | d4 = 37.5238 | n4 = 1 |
| r5 = $\infty$ (Aperture stop) | d5 = 37.5238 | n5 = 1 |
| r6 = −94.6677 (*) | d6 = 1.0 | n6 = 0.762 |
| r7 = $\infty$ | d7 = 28.491 | n7 = 1 |
| r8 = −95.0930 (*) | d8 = 1.0 | n8 = 0.6696 |
| r9 = $\infty$ (Stray acoustic beam stop) | d9 = 160 | n9 = 1 |
| r10 = $\infty$ (Image) | | |

$P^{(2)} = 1.0$
$P^{(4)} = 1.0$ $A4^{(4)} = -0.58491 \times 10^{-6}$
$A6^{(4)} = -0.24789 \times 10^{-9}$
$A8^{(4)} = 0.32596 \times 10^{-13}$
$P^{(6)} = 1.0$ $A4^{(6)} = 0.58491 \times 10^{-6}$
$A6^{(6)} = 0.24789 \times 10^{-9}$
$A8^{(8)} = -0.32596 = 10^{-13}$
$P^{(8)} = 1.0$
$\beta = 1$, v0/v1 = 0.6696, 0.762, PS = 0.145

Embodiment 10 f = 126, F/2.82, $\omega = 14.2°$

| | | |
|---|---|---|
| r0 = $\infty$ (Object) | d0 = 160 | n0 =1 |
| r1 = $\infty$ (Stray acoustic beam stop) | d1 = 1.0 | n1 = 0.6696 |
| r2 = 78.2721 (*) d2 = 27.9934 | n2 = 1 | |
| r3 = −272.1705 d3 = 1.0 | n3 = 0.6696 | |
| r4 = $\infty$ | d4 = 31.7784 | n4 = 1 |
| r5 = $\infty$ (Aperture stop) | d5 = 31.7784 | n5 = 1 |
| r6 = $\infty$ | d6 = 1.0 | n6 = 0.6696 |
| r7 = 83.9282 | d7 = 43.0056 | n7 = 1 |
| r8 = −122.5614 (*) | d8 = 1.0 | n8 = 0.6696 |
| r9 = $\infty$ (Stray acoustic beam stop) | d9 = 151.05 | n9 = 1 |
| r10 = $\infty$ (Image) | | |

-continued

| | | |
|---|---|---|
| $P^{(2)} = 1.0$ $A4^{(2)} = -0.50262 \times 10^{-6}$ | | |
| $P^{(8)} = 1.0$ $A4^{(8)} = -0.10253 \times 10^{-5}$ | | |
| β = 1, v0/v1 = 0.6696, PS = 0.1512 | | |
| Embodiment 11 | | |
| f = 115.65, F/2.3, ω = 13.5° | | |
| r0 = ∞ (Object) | d0 = 160 | n0 = 1 |
| r1 = ∞ (Stray acoustic beam stop) | d1 = 1.0 | n1 = 0.6696 |
| r2 = 86.8198 (*) | d2 = 32.3569 | n2 = 1 |
| r3 = −120.5843 | d3 = 1.0 | n3 = 0.6696 |
| r4 = ∞ | d4 = 33.1269 | n4 = 1 |
| r5 = ∞ (Aperture stop) | d5 = 32.7272 | n5 = 1 |
| r6 = ∞ | d6 = 1.0 | n6 = 0.6696 |
| r7 = 75.7517 | d7 = 42.1819 | n7 = 1 |
| r8 = −72.5114 (*) | d8 = 1.5 | n8 = 0.6696 |
| r9 = ∞ (Stray acoustic beam stop) | d9 = 90.848 | n9 = 1 |
| r10 = ∞ (Image) | | |
| $P^{(2)} = 1.0$ $A4^{(2)} = -0.73163 \times 10^{-6}$ | | |
| $P^{(8)} = 1.0$ $A4^{(8)} = 0.17805 \times 10^{-5}$ | | |
| β = 1, v0/v1 = 0.6696, PS = 0.178 | | |
| Embodiment 12 | | |
| f = 95.4, F/1.9685, ω = 14° | | |
| r0 = ∞ (Object) | d0 = 160 | n0 = 1 |
| r1 = ∞ (Stray acoustic beam stop) | d1 = 1.0 | n1 = 0.6696 |
| r2 = 85.0 (*) | d2 = 45.5005 | n2 = 1 |
| r3 = 94.4515 | d3 = 1.0 | n3 = 0.6696 |
| r4 = ∞ | d4 = 22.2171 | n4 = 1 |
| r5 = ∞ (Aperture stop) | d5 = 24.1421 | n5 = 1 |
| r6 = ∞ | d6 = 1.0 | n6 = 0.6696 |
| r7 = 53.7640 | d7 = 38.4016 | n7 = 1 |
| r8 = −53.1737 (*) | d8 = 1.5 | n8 = 0.6696 |
| r9 = ∞ (Stray acoustic beam stop) | d9 = 56.335 | n9 = 1 |
| r10 = ∞ (Image) | | |
| $P^{(2)} = 1.0$ $A4^{(2)} = -0.11042 \times 10^{-5}$ | | |
| $P^{(8)} = 1.0$ $A4^{(8)} = -0.49295 \times 10^{-5}$ | | |
| β = 0.5, v0/v1 = 0.6696, PS = 0.187 | | |

In each embodiment, $r_1, r_2, \ldots$ represent radii of curvature of individual lens surfaces, $d_1, d_2, \ldots$ spaces between individual lens surfaces, and $n_1, n_2, \ldots$ refractive indices of media between individual lens surfaces. The asterisk (*) following each numerical value of some radii of curvature indicates the aspherical surface of the corresponding surface. Further, f represents the refractive index of the entire lens system, F/ the F-number, ω the half angle of view, $P^{(i)}$ the constant of the cone of the i-th lens surface, $A_{2j}^{(i)}$ the 2j order aspherical coefficient of the i-th lens surface, β the imaging magnification of the lens system, and PS the Petzval's sum of the lens system.

Figure 12:
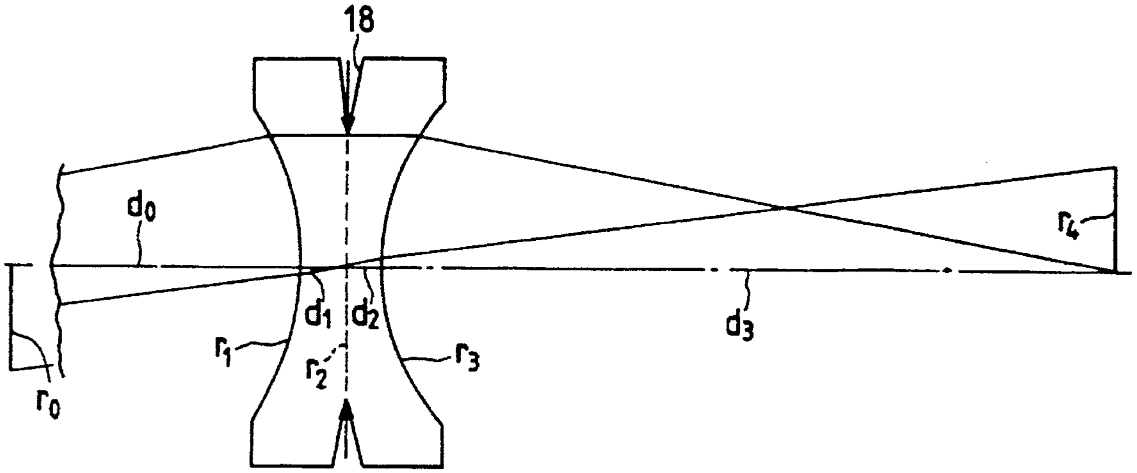
Figure 13A:
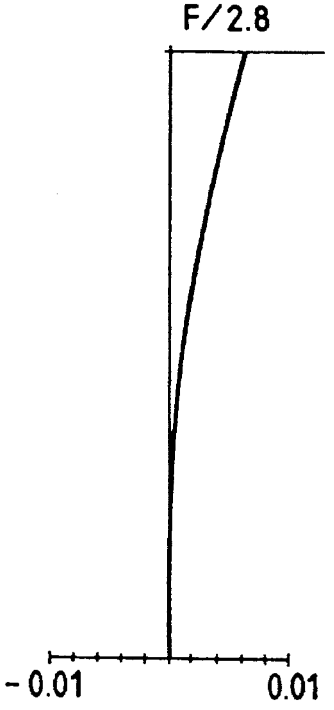
Figure 13B:
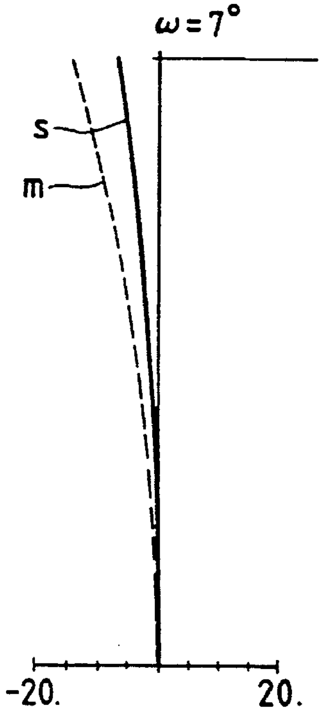

The lens configuration of Embodiment 1 is shown in FIG. 12 and the aberration diagram thereof in FIGS. 13A and 13B. This embodiment shows a single lens, whose surfaces are aspherical. Since the lens system has an angle of view of 7° which is not relatively large, each aspherical surface forms a part of a spheroid taking the axis of the lens system as the major axis in order to make principally the correction for spherical aberration. The medium of the lens is polystyrene. A groove 18 is provided at the periphery of the lens is adapted to dispose the acoustic beam stop and is filled with silicon rubber excellent in acoustical absorbing characteristic, thereby enabling the aperture of the lens system to be limited and the stray acoustic beam to be eliminated.

Figure 14:
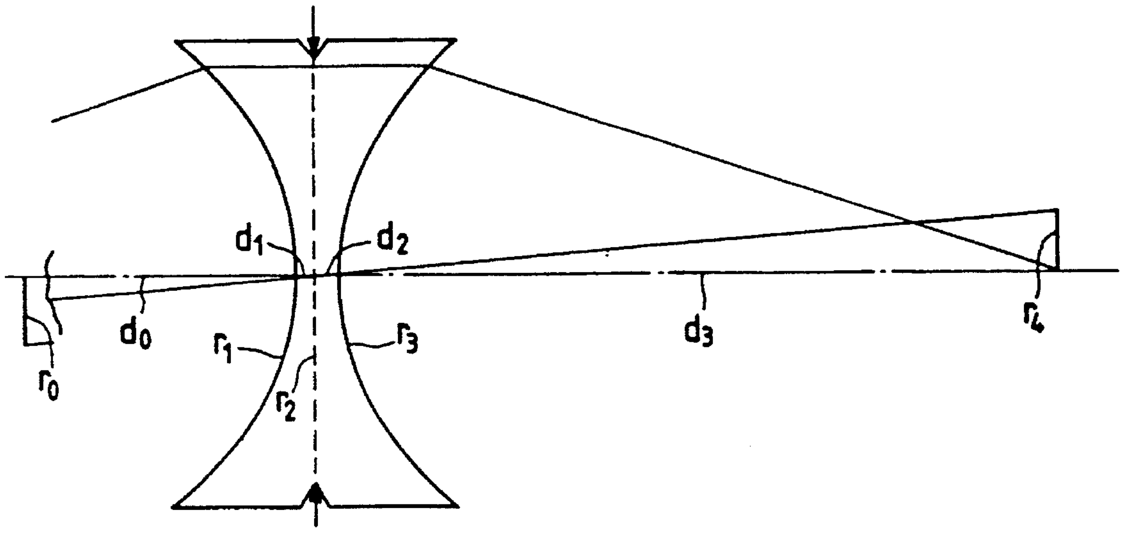
Figure 15A:
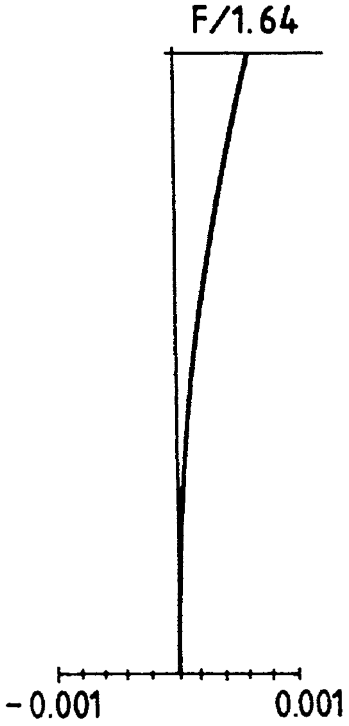
Figure 15B:
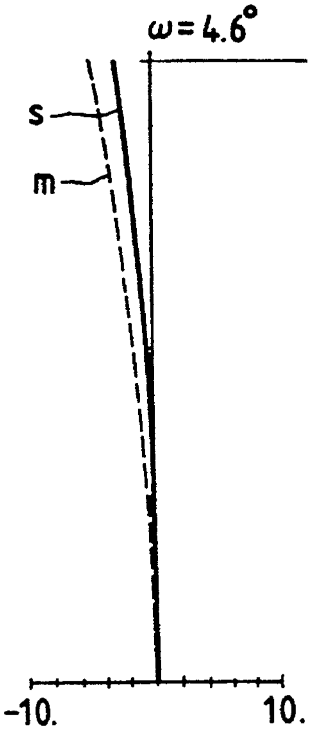

Next, the lens configuration of Embodiment 2 is shown in FIG. 14 and the aberration diagram thereof in FIGS. 15A and 15B. The configuration in FIG. 14, although similar to Embodiment 1, is adapted to make particularly favorable correction for spherical aberration up to the aperture as large as F/1.64. The medium of the lens is polystyrene.

Figure 16:
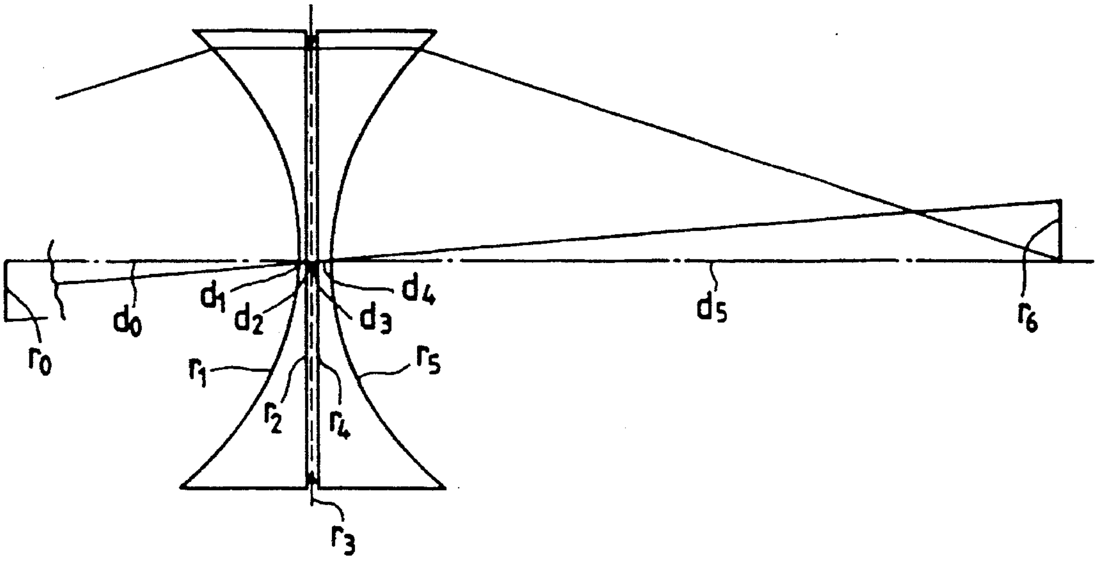
Figure 17A:
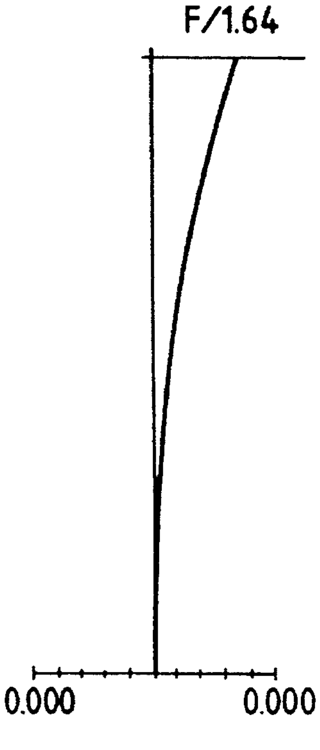
Figure 17B:
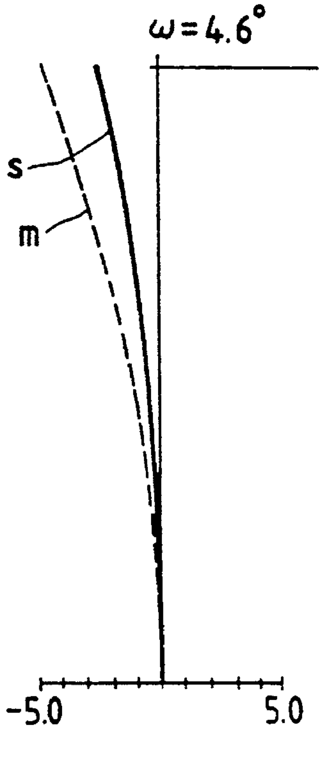

FIGS. 16 and 17A and 17B depict the lens configuration and the aberration diagram of Embodiment 3, respectively. This embodiment is such that, in order to diminish the attenuation of acoustic waves in the lens medium, the lens system is divided into two lens elements, as compared with Embodiment 2, to provide the minimum thickness possible by replacing the middle portion with water. The lens medium is polystyrene.

Figure 18:
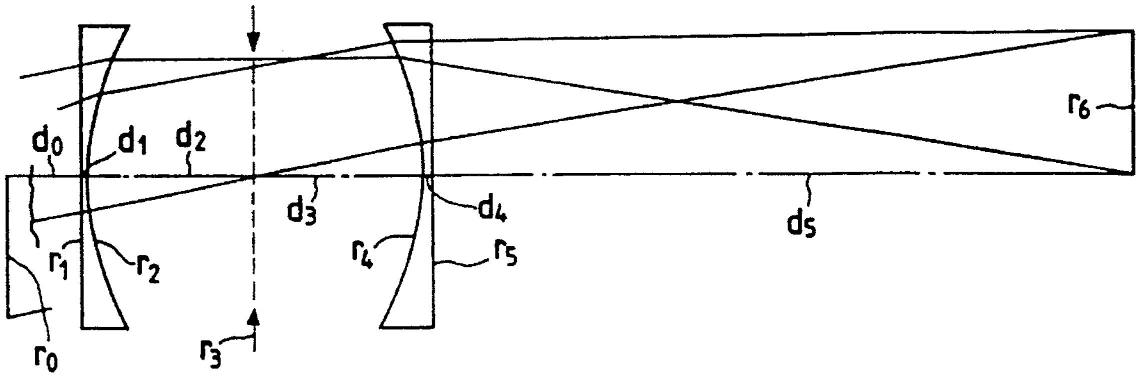
Figure 19A:
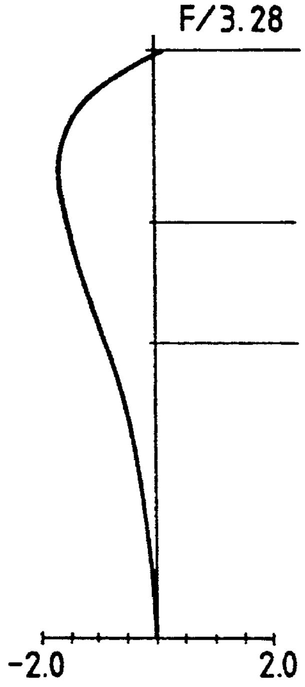
Figure 19B:
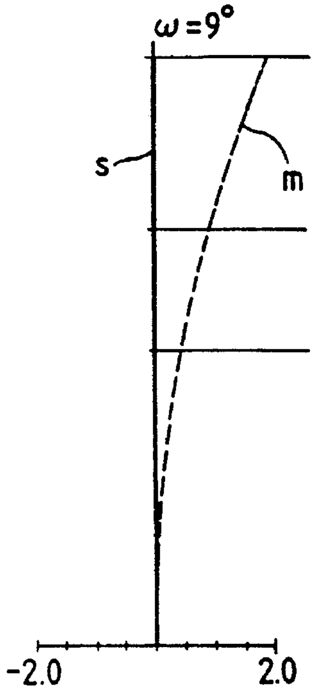

FIGS. 18 and 19A and 19B show the lens configuration and the aberration diagram of Embodiment 4, respectively. This embodiment comprises a pair of lens elements in which the concave surfaces are directed toward the acoustic beam stop 8 and their opposite surfaces are plane surfaces. Each concave surface has the shape close to the hyperboloid so that astigmatism as well as spherical aberration can be sufficiently corrected, and consequently the lens system can have the angle of view as large as ω=9°. Each lens element is provided with the smallest possible thickness to prevent the attenuation of acoustic waves in the lens medium. Moreover, the space between the lens elements is expanded to thereby reduce the refracting powers of the concave surfaces so that the radii of curvature are increased as far as possible. As such, the thickness of each lens element becomes relatively small even at some distance from the axis, along with the reason that the shape of each concave surface approximates the hyperboloid, and the lens system assumes the configuration such that the attenuation of acoustic waves is minimized. The lens medium is polystyrene.

Figure 20:
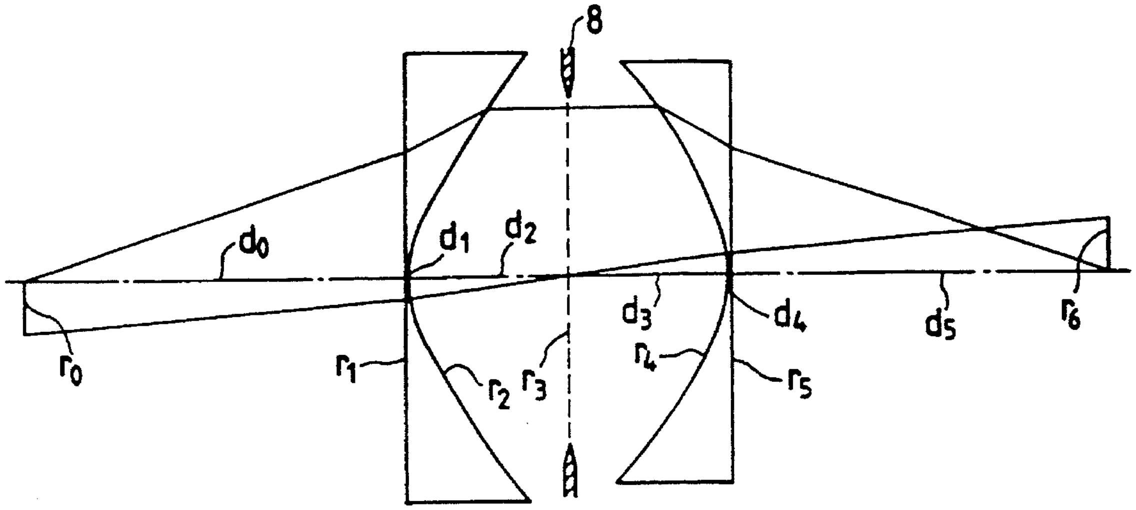
Figure 21A:
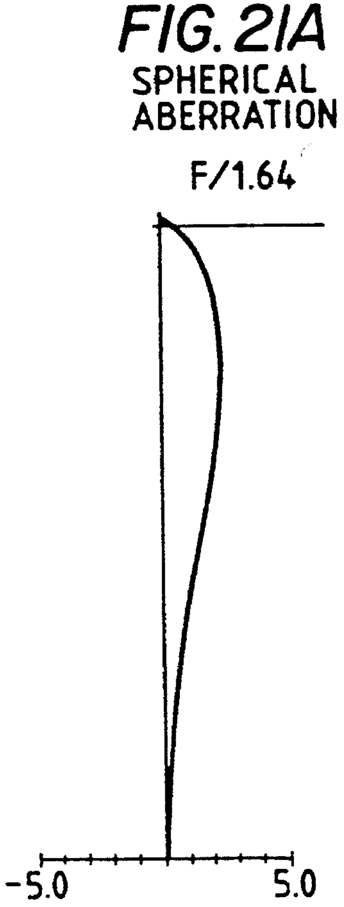
Figure 21B:
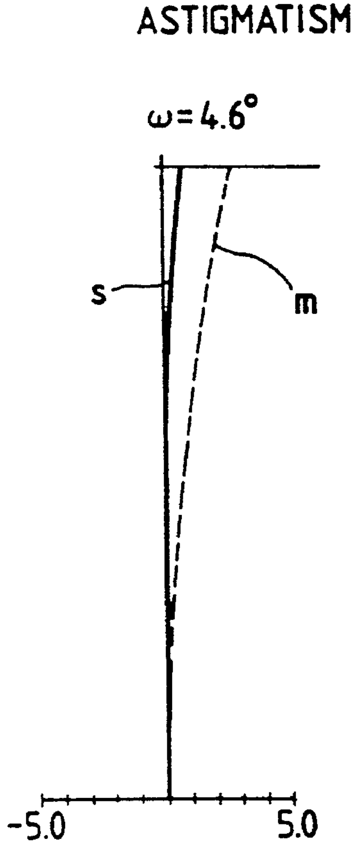

The lens configuration of Embodiment 5 is shown in FIG. 20 and the aberration diagram thereof in FIGS. 21A and 21B. This embodiment is adapted to have the aperture as large as F/1.64 compared with Embodiment 4 and to make favorably the correction of spherical aberration in particular. Although the angle of view has the value as small as 4.6°, high resolution can be secured. Each aspherical surface assume the shape of a complete hyperboloid. The lens medium is polystyrene.

Figure 22:
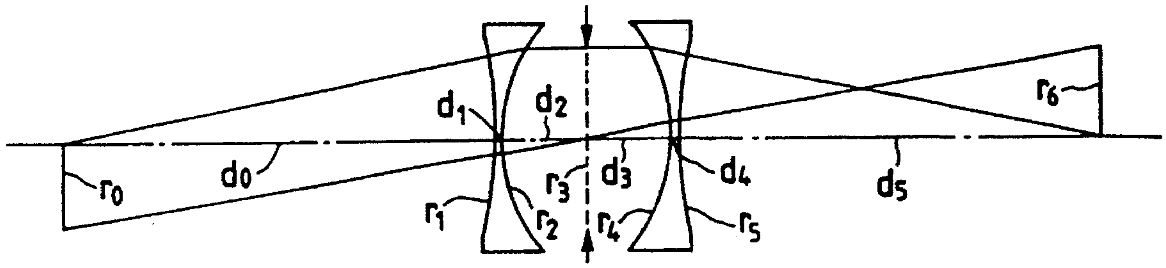
Figure 23A:
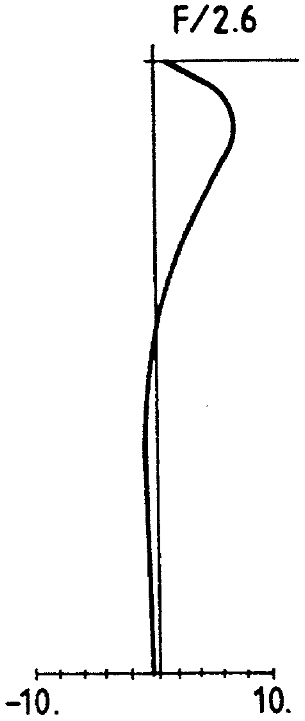
Figure 23B:
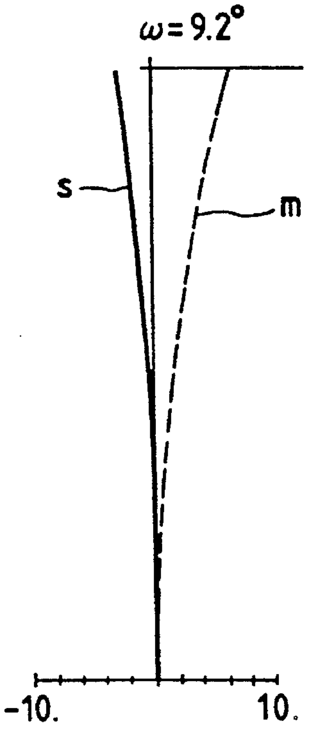

The lens configuration and the aberration diagram of Embodiment 6 are shown in FIGS. 22 and 23A and 23B, respectively. This embodiment is such that the outside surfaces which are the plane surfaces in Embodiment 4 are provided with the refracting powers. The lens medium is TPX004.

Figure 24:
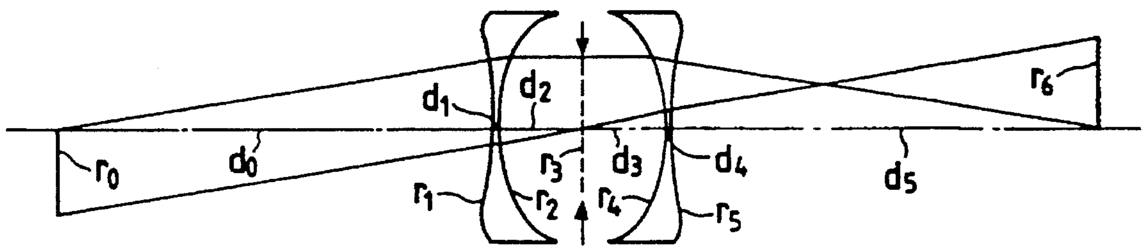
Figure 25A:
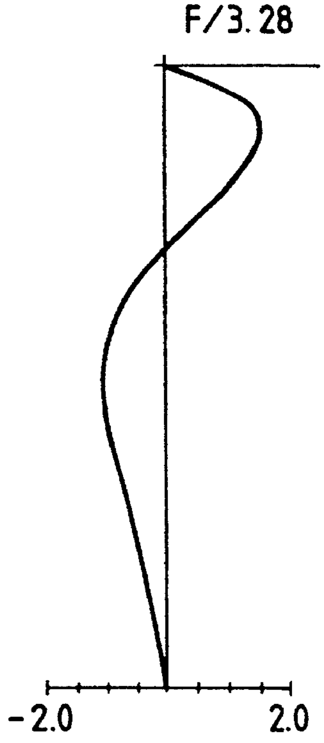
Figure 25B:
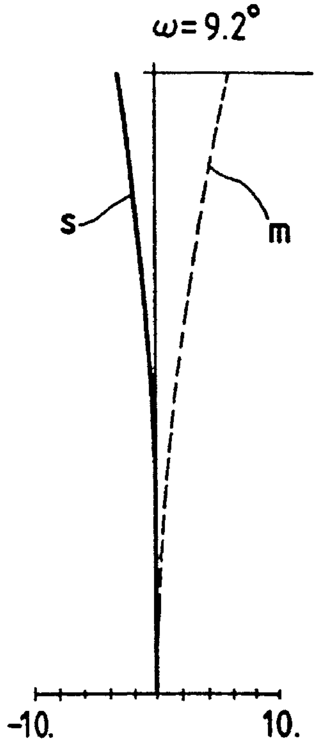

The lens configuration of Embodiment 7 is shown in FIG. 24 and the aberration diagram thereof in FIGS. 25A and 25B. This embodiment is also such that the outside surfaces which are the plane surfaces in Embodiment 4 are provided with the refracting powers. The lens medium is TPX004.

Figure 26:
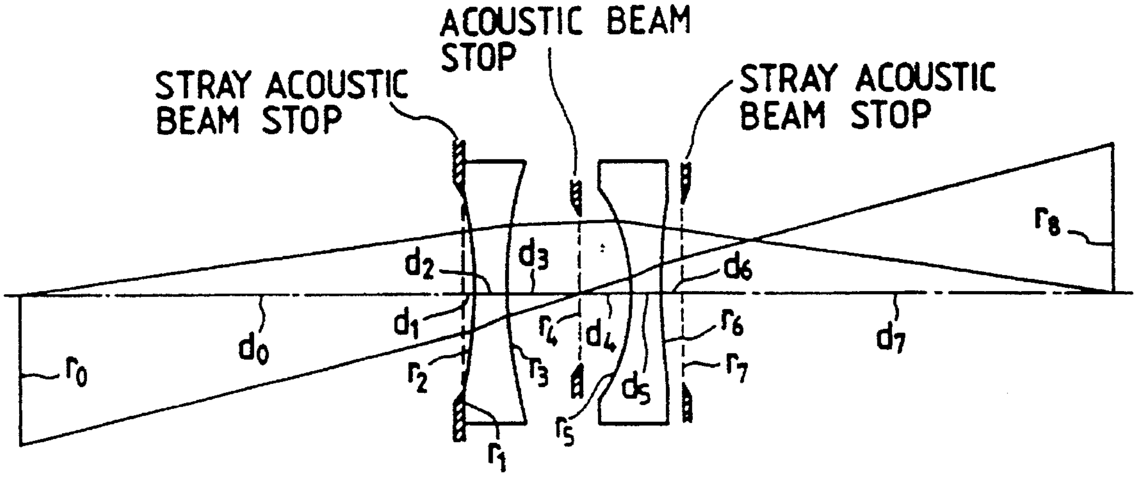
Figure 27A:
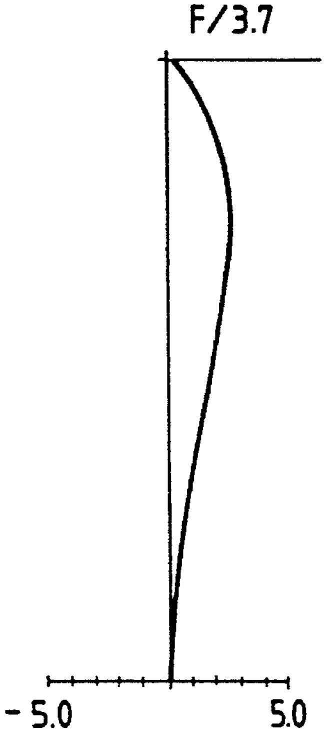
Figure 27B:
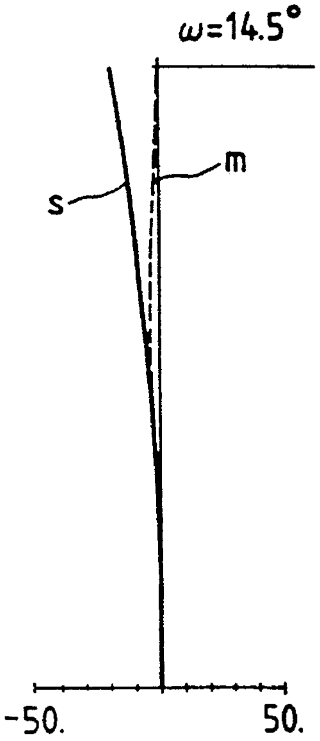

FIGS. 26 and 27A and 27B illustrate the lens configuration and the aberration diagram of Embodiment 8, respectively. In this embodiment, the concave surfaces directed toward an acoustic beam stop are shaped into the spherical surfaces and the outside surfaces of convexity toward the stop into the aspherical surfaces, by which curvature of field is slightly corrected. Further, the lens system is provided with stray acoustic beam stops, in addition to the acoustic beam stop, on the incidence and emergence sides. The lens medium is polystyrene.

The lens configuration of Embodiment 9 is depicted in FIG. 28 and the aberration diagram thereof in FIGS. 29A and 29B. In this embodiment, plano-concave lens elements directing their concave surfaces toward the acoustic beam stop are disposed, two by two, to be symmetrical in regard to the stop and the concave surfaces of two inner lens elements are configured into the aspherical surfaces, thereby making the correction for spherical aberration and astigmatism. Although the outer diameter of the lens may increase because the overall length of the lens system is considerable, the stray acoustic beam stop blocks an off-axis acoustic beam to limit the outer diameter. For lens media, two outer lens elements are polystyrene and two inner lens elements are TPX004.

Figure 30:
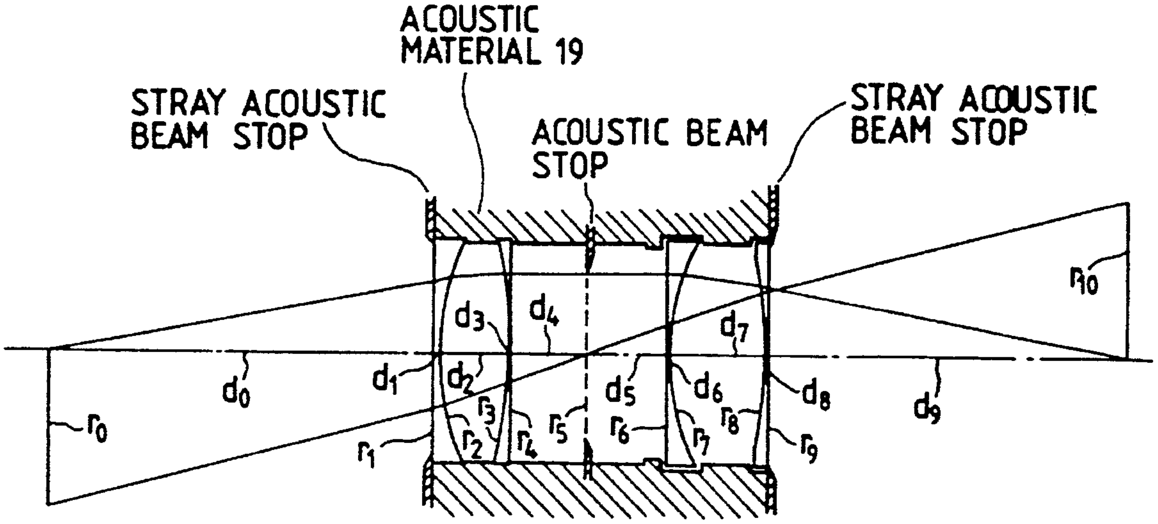
Figure 31A:
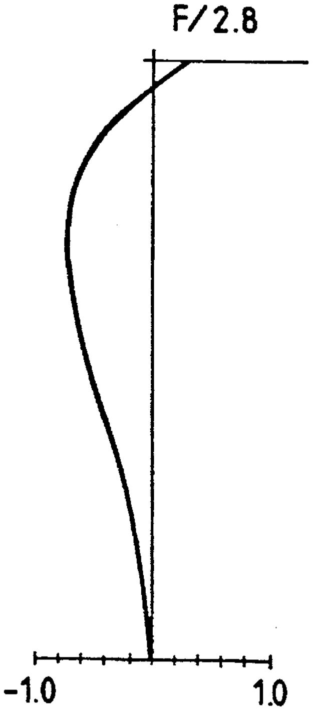
Figure 31B:
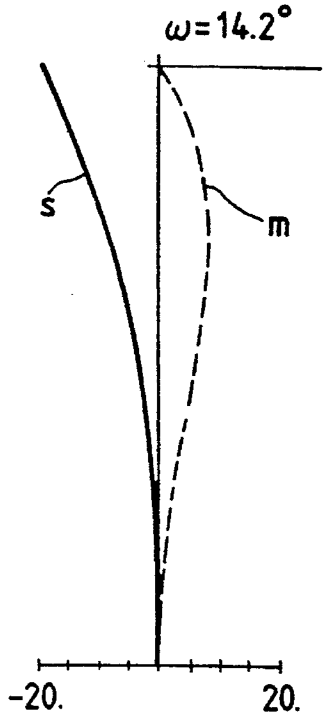

The lens configuration of Embodiment 10 is shown in FIG. 30 and the aberration diagram thereof in FIGS. 31A and 31B. This embodiment is constructed so that a lens element and a plano-concave lens element directing their concave surfaces toward the acoustic beam stop are combined with a lens element and a plano-concave lens element directing their convex surfaces toward the stop and the aspherical surfaces are introduced into the concave surfaces of two outer lens elements, thereby making the correction for spherical aberration and astigmatism. For this reason, in the embodiment, the radii of curvature of individual surfaces are selected so that Equation (27) is satisfied. Also, reference numeral 19 in FIG. 30 denotes a lens frame for holding the lens. By constructing the frame itself of a material excellent in acoustical absorbing characteristic, such as silicon rubber, the reflection of acoustic waves from portions other than the periphery of the lens is also minimized with the resultant effect of noise reduction.

Figure 32:
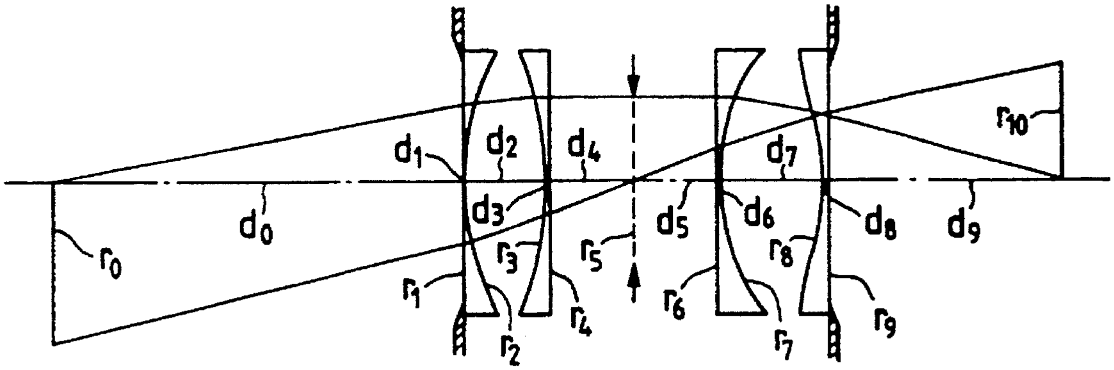
Figure 33A:
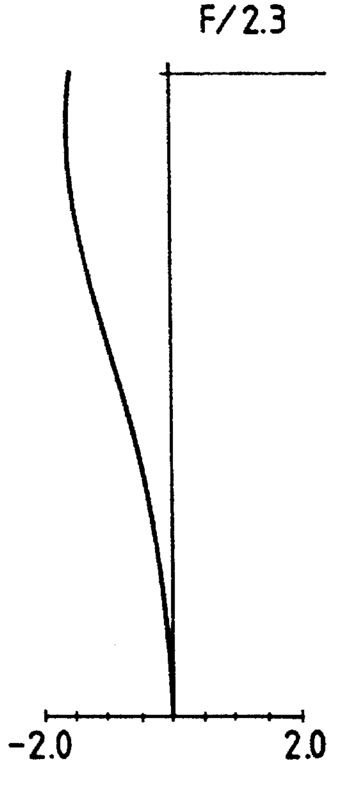
Figure 33B:
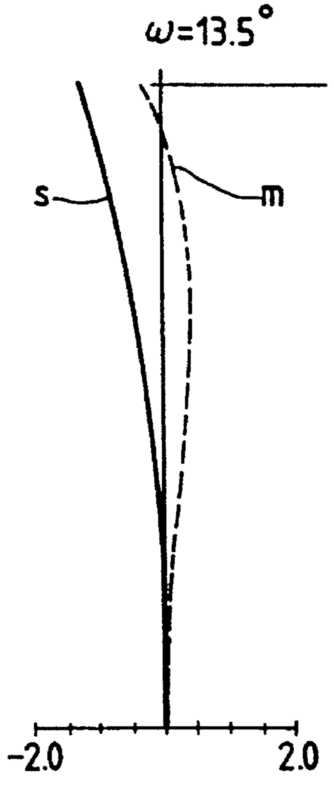

The lens configuration and the aberration diagram of Embodiment 11 are FIGS. 32 and 33A and 33B, respectively. Although the imaging magnification in each of Embodiments 1 to 10 is −1x, this embodiment has an imaging magnification of −0.7x. The application of the shape and aspherical surface of each lens element is the same as in Embodiment 10. The lens medium is polystyrene.

Figure 34:
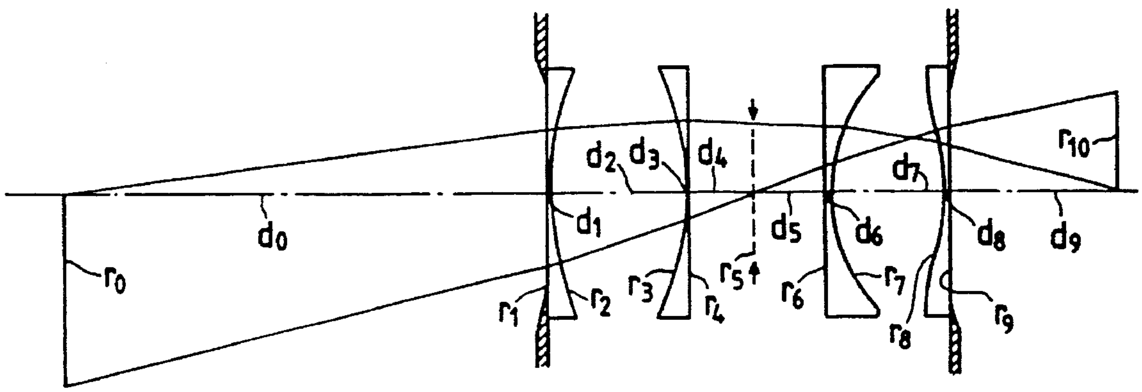
Figure 35A:
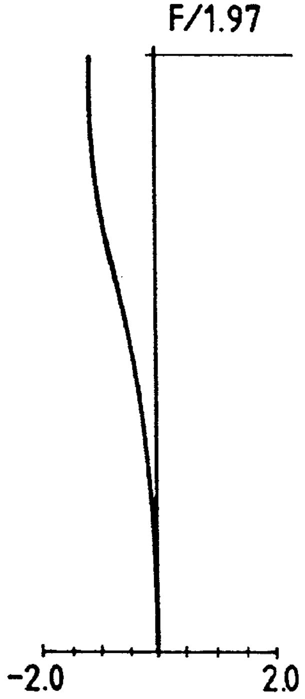
Figure 35B:
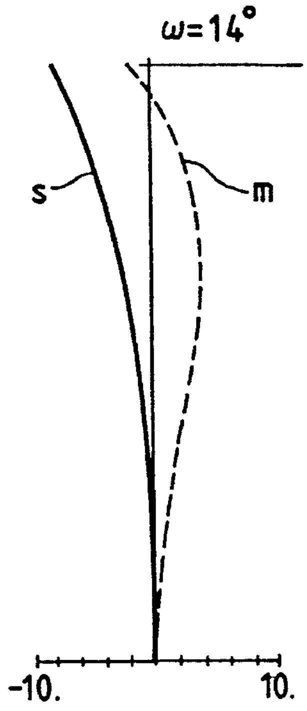

Finally, the lens configuration of Embodiment 12 is shown in FIG. 34 and the aberration diagram thereof in FIGS. 35A and 35B. This embodiment has the same lens configuration as in Embodiment 10 and is adapted to provide an imaging magnification of −0.5x.

What is claimed is:

1. An acoustic lens system for imaging acoustic waves emitted from an object, wherein at least one lens surface of acoustic lenses constituting said acoustic lens system is configured as an aspherical surface;

wherein said acoustic lens system has an acoustic beam stop therein; and wherein said acoustic lens system satisfies the condition:

$$\Sigma P_{oi} d_{oi} > \Sigma P_{Tj} d_{Tj}$$

where $P_{oi}$ and $P_{Tj}$ are refracting powers of concave and convex surfaces directed toward the acoustic beam stop, respectively, and $d_{oi}$ and $d_{Tj}$ are distances from these surfaces to the acoustic beam stop, respectively.

2. An acoustic lens system for imaging acoustic waves emitted from an object, wherein at least one lens surface of acoustic lenses constituting said acoustic lens system is configured as an aspherical surface;

wherein said acoustic lens system has an acoustic beam stop therein; and wherein said acoustic lens system satisfies the condition:

$$R_0 < R_T$$

where $R_0$ is the average of radii of curvature of surfaces which assume concave shapes toward the acoustic beam stop and $R_T$ is the average of radii of curvature of surfaces which assume convex shapes toward the acoustic beam stop.

3. An acoustic lens system for imaging acoustic waves emitted from an object, wherein at least one lens surface of acoustic lenses constituting said acoustic lens system is configured as an aspherical surface;

wherein said aspherical surface is shaped such that curvature of said aspherical surface moderates progressively in separating from an axis of said acoustic lens system; and wherein said acoustic lens system comprises two biconcave lenses between which a medium layer for acoustic wave transmission is sandwiched and whose concave surfaces are opposite to each other, said two biconcave lenses being configured so that radii of curvature of surfaces directed toward each other are smaller than those of surfaces on opposite sides thereof and said concave surfaces are substantially revolution-hyperboloidal.

4. An acoustic lens system for imaging acoustic waves emitted from an object, wherein at least one lens surface of acoustic lenses constituting said acoustic lens system is configured as an aspherical surface;

wherein said acoustic lens system has an acoustic beam stop therein; and wherein a stray acoustic beam stop is disposed on each of incidence and emergence sides of said acoustic lens system.

5. An acoustic lens system for imaging acoustic waves emitted from an object, wherein at least one lens surface of acoustic lenses constituting said acoustic lens system is configured as an aspherical surface;

wherein said acoustic lens system has an acoustic beam stop therein; and wherein said acoustic lens system comprises a first lens unit and a second lens unit disposed on opposite sides of said acoustic beam stop, each of said first lens unit and said second lens unit including two lenses directing concave surfaces toward the acoustic beam stop, and wherein the concave surface of the lens closest to the acoustic beam stop in each lens unit is aspherical.

6. An acoustic lens system for imaging acoustic waves emitted from an object, wherein at least one lens surface of acoustic lenses constituting said acoustic lens system is configured as an aspherical surface;

wherein said acoustic lens system has an acoustic beam stop therein; and wherein said acoustic lens system comprises a first lens unit and a second lens unit disposed on opposite sides of said acoustic beam stop, each of said first lens unit and said second lens unit including two lenses directing concave surfaces toward each other, and wherein the concave surface of the lens farthest from the acoustic beam stop in each lens unit is aspherical.

7. An ultrasonic system having an ultrasonic transducer emitting ultrasonic waves toward an object and detecting the ultrasonic waves reflected from said object and an acoustic lens system converging the ultrasonic waves emitted from said ultrasonic transducer onto said object and converging the ultrasonic waves reflected from said object onto said ultrasonic transducer, wherein at least one of lens surfaces of said acoustic lens system is configured as an aspherical surface;

wherein said acoustic lens system has an acoustic beam stop therein; and wherein said acoustic lens system satisfies the condition:

$$\Sigma P_{oi} d_{oi} > \Sigma P_{Tj} d_{Tj}$$

where $P_{oi}$ and $P_{Tj}$ are refracting powers of concave and convex surfaces directed toward the acoustic beam stop, respectively, and $d_{oi}$ and $d_{Tj}$ are distances from these surfaces to the acoustic beam stop, respectively.

8. An ultrasonic system having an ultrasonic transducer emitting ultrasonic waves toward an object and detecting the ultrasonic waves reflected from said object and an acoustic lens system converging the ultrasonic waves emitted from said ultrasonic transducer onto said object and converging the ultrasonic waves reflected from said object onto said ultrasonic transducer, wherein at least one of lens surfaces of said acoustic lens system is configured as an aspherical surface;

wherein said acoustic lens system has an acoustic beam stop therein; and wherein said acoustic lens system satisfies the condition:

$$R_0 < R_T$$

where $R_0$ is the average of radii of curvature of surfaces which assume concave shapes toward the acoustic beam stop and $R_T$ is the average of radii of curvature of surfaces which assume convex shapes toward the acoustic beam stop.

9. An ultrasonic system having an ultrasonic transducer emitting ultrasonic waves toward an object and detecting the ultrasonic waves reflected from said object and an acoustic lens system converging the ultrasonic waves emitted from said ultrasonic transducer onto said object and converging the ultrasonic waves reflected from said object onto said ultrasonic transducer, wherein at least one lens surfaces of said ultrasonic system is configured as an aspherical surface;

wherein said aspherical surface is shaped such that curvature of said aspherical surface moderates progressively in separating from an axis of said acoustic lens system; and wherein said acoustic lens system comprises two biconcave lenses between which a medium layer for acoustic wave transmission is sandwiched and whose concave surfaces are opposite to each other, said two biconcave lenses being configured so that radii of curvature of surfaces directed toward each other are smaller than those of surfaces on opposite sides thereof and said concave surfaces are substantially revolution-hyperboloidal.

10. An ultrasonic system having an ultrasonic transducer emitting ultrasonic waves toward an object and detecting the ultrasonic waves reflected from said object and an acoustic lens system converging the ultrasonic waves emitted from said ultrasonic transducer onto said object and converging the ultrasonic waves reflected from said object onto said ultrasonic transducer, wherein at least one of lens surfaces of said acoustic lens system is configured as an aspherical surface;

wherein said acoustic lens system has an acoustic beam stop therein; and wherein a stray acoustic beam stop is disposed on each of incidence and emergence sides of said acoustic lens system.

11. An ultrasonic system having an ultrasonic transducer emitting ultrasonic waves toward an object and detecting the ultrasonic waves reflected from said object and an acoustic lens system converging the ultrasonic waves emitted from said ultrasonic transducer onto said object and converging the ultrasonic waves reflected from said object onto said ultrasonic transducer, wherein at least one lens surfaces of said ultrasonic system is configured as an aspherical surface;

wherein said ultrasonic system has an acoustic beam stop therein; and wherein said acoustic lens system comprises a first lens unit and a second lens unit disposed on opposite sides of said acoustic beam stop, each of said first lens unit and said second lens unit including two lenses directing concave surfaces toward the stop, and wherein the concave surface of the lens closest to the acoustic beam stop in each lens unit is aspherical.

12. An ultrasonic system having an ultrasonic transducer emitting ultrasonic waves toward an object and detecting the ultrasonic waves reflected from said object and an acoustic lens system converging the ultrasonic waves emitted from said ultrasonic transducer onto said object and converging the ultrasonic waves reflected from said object onto said ultrasonic transducer, wherein at least one lens surfaces of said ultrasonic system is configured as an aspherical surface;

wherein said ultrasonic system has an acoustic beam stop therein; and wherein said acoustic lens system comprises a first lens unit and a second lens unit disposed on opposite sides of said acoustic beam stop, each of said first lens unit and said second lens unit including two lenses directing concave surfaces toward each other, and wherein the concave surface of the lens farthest from the acoustic beam stop in each lens unit is aspherical.

* * * * *